(12) United States Patent
Even et al.

(10) Patent No.: US 7,085,716 B1
(45) Date of Patent: Aug. 1, 2006

(54) SPEECH RECOGNITION USING WORD-IN-PHRASE COMMAND

(75) Inventors: Stijn Van Even, Jamaica Plain, MA (US); Li Li, Bedminster, NJ (US); Xianju Du, Acton, MA (US); Puming Zhan, Acton, MA (US)

(73) Assignee: Nuance Communications, Inc., Burlington, MA (US)

( * ) Notice: Subject to any disclaimer, the term of this patent is extended or adjusted under 35 U.S.C. 154(b) by 841 days.

(21) Appl. No.: 09/696,685

(22) Filed: Oct. 26, 2000

(51) Int. Cl.
*G10I 15/26* (2006.01)

(52) U.S. Cl. ..................................... 704/235; 704/251
(58) Field of Classification Search ................ 704/235, 704/251
See application file for complete search history.

(56) References Cited

U.S. PATENT DOCUMENTS

| | | | | |
|---|---|---|---|---|
| 5,689,617 A | * | 11/1997 | Pallakoff et al. | 704/255 |
| 5,794,189 A | | 8/1998 | Gould | 704/231 |
| 5,799,279 A | | 8/1998 | Gould et al. | 704/275 |
| 5,960,395 A | | 9/1999 | Tzirkel-Hancock | 704/241 |
| 5,995,934 A | * | 11/1999 | Tang | 704/270 |
| 6,064,959 A | | 5/2000 | Young et al. | 704/251 |
| 6,601,027 B1 | * | 7/2003 | Wright et al. | 704/235 |
| 2002/0193989 A1 | * | 12/2002 | Geilhufe et al. | 704/208 |

FOREIGN PATENT DOCUMENTS

WO   WO 99/16051   4/1999

OTHER PUBLICATIONS

S. Wegmann et al., "Speaker Normalization on Conversational Speech," Proc. 1996 ICASSP, pp. I.339-I.341.
International Searching Authority, PCT International Search Report, International Application No. PCT/US01/42784, Feb. 5, 2002.
Gen-ichiro Kikui et al., "Similarity-Based Identification of Repairs in Japanese Spoken Language," International Conference on Spoken Language Processing (ICSLP), Yokahoma, Japan, vol. 2, Sep. 18, 1994, pp. 915-918, XP000855399.
Yue-Shi Lee et al., "Applying Repair Processing in Chinese Homophone Disambiguation," Proceedings of the Conference on Applied Natural Language Processing, Association Computer Linguistics, Morristown, NJ, US, Mar. 31, 1997, pp. 57-63, XP001130700.
Supplementary European Search Report for EP 01983212.0, European Patent Office, issued Dec. 6, 2005, 3 pages.

* cited by examiner

*Primary Examiner*—Donald L. Storm
(74) *Attorney, Agent, or Firm*—Fish & Richardson P.C.

(57) ABSTRACT

A method is described that corrects incorrect text associated with recognition errors in computer-implemented speech recognition. The method includes the step of performing speech recognition on an utterance to produce a recognition result for the utterance. The command includes a word and a phrase. The method includes determining if a word closely corresponds to a portion of the phrase. A speech recognition result is produced if the word closely corresponds to a portion of the phrase.

36 Claims, 27 Drawing Sheets

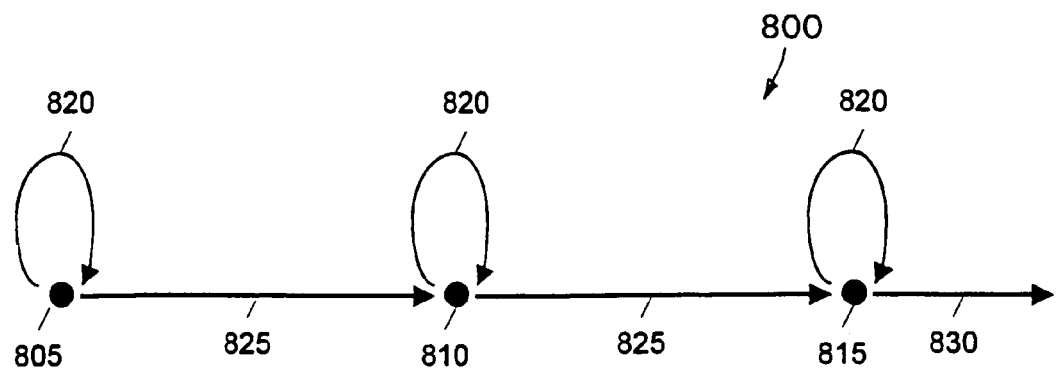
FIG. 8A
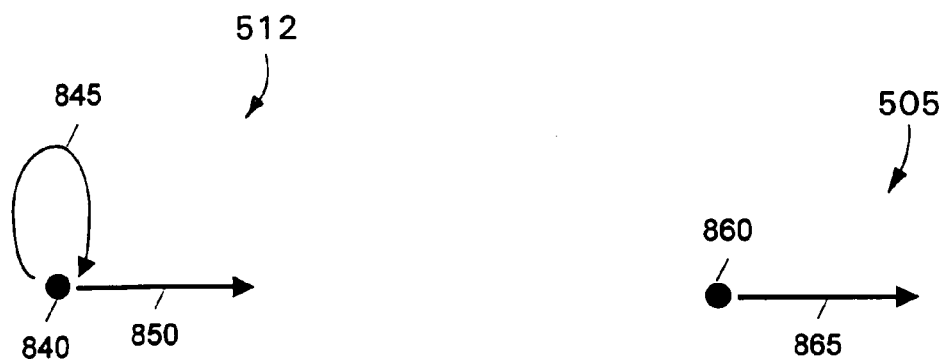
FIG. 8B
FIG. 8C

FIG. 9

| Frame | 840 ("A") | 805 ("B") | 810 ("C") | 815 ("D") | Next Node ("N") |
|---|---|---|---|---|---|
| 900 — 0 | 0 | --- | --- | --- | --- |
| 905 — 1 | $S_{A1} = A_{A1}$ | $S_{B1} = A_{B1}$ | --- | --- | --- |
| 910 — 2 | $S_{A2} = S_{A1} + A_{A2}$ | $S_{B2} = \min(S_{B1} + stay_{B'}, S_{A1}) + A_{B2}$ | $S_{C2} = S_{B1} + leave_B + A_{C2}$ | --- | --- |
| 915 — 3 | $S_{A3} = S_{A2} + A_{A3}$ | $S_{B3} = \min(S_{B2} + stay_{B'}, S_{A2}) + A_{B3}$ | $S_{C3} = \min(S_{C2} + stay_{C'}, S_{B2} + leave_B) + A_{C3}$ | $S_{D3} = S_{C2} + leave_C + A_{D3}$ | --- |
| 920 — 4 | $S_{A4} = S_{A3} + A_{A4}$ | $S_{B4} = \min(S_{B3} + stay_{B'}, S_{A3}) + A_{B4}$ | $S_{C4} = \min(S_{C3} + stay_{C'}, S_{B3} + leave_B) + A_{C4}$ | $S_{D4} = \min(S_{D3} + stay_D, S_{C3} + leave_C) + A_{D4}$ | $S_{N4} = S_{D2} + leave_D + A_{D4}$ |
| 925 — n | $S_{An} = S_{An-1} + A_{An}$ | $S_{Bn} = \min(S_{Bn-1} + stay_{B'}, S_{An-1}) + A_{Bn}$ | $S_{Cn} = \min(S_{Cn-1} + stay_{C'}, S_{Bn-1} + leave_B) + A_{Cn}$ | $S_{Dn} = \min(S_{Dn-1} + stay_D, S_{Cn-1} + leave_C) + A_{Dn}$ | $S_{NN} = \min(S_{Nn-1} + stay_{M'}, S_{Mn-1} + leave_M) + A_{Nm}$ |

FIG. 10

| Frame | 810 ("A") | 805 ("B") | 810 ("C") | 815 ("D") | Next Node ("N") |
|---|---|---|---|---|---|
| 900 — 0 | $S_{A0} = 0$ | --- | --- | --- | --- |
| 905 — 1 | $S_{A1} = f(S_{A0}, A_{A1})$ | $S_{B1} = f(S_{A0}, A_{B1})$ | --- | --- | --- |
| 910 — 2 | $S_{A2} = f(S_{A1}, A_{A2})$ | $S_{B2} = f(S_{B1}, stay_{B'}, S_{A1}, A_{B2})$ | $S_{C2} = f(S_{B1}, leave_B, A_{C2})$ | --- | --- |
| 915 — 3 | $S_{A3} = f(S_{A2}, A_{A3})$ | $S_{B3} = f(S_{B2}, stay_{B'}, S_{A2}, A_{B3})$ | $S_{C3} = f(S_{C2}, stay_{C'}, S_{B2}, leave_{B'}, A_{C3})$ | $S_{D3} = f(S_{C2}, leave_C, A_{D3})$ | --- |
| 920 — 4 | $S_{A4} = f(S_{A3}, A_{A4})$ | $S_{B4} = f(S_{B3}, stay_{B'}, S_{A3}, A_{B4})$ | $S_{C4} = f(S_{C3}, stay_{C'}, S_{B3}, leave_{B'}, A_{C4})$ | $S_{D4} = f(S_{D3}, stay_D, S_{C3}, leave_C, A_{D4})$ | $S_{N4} = f(S_{D3}, leave_D, A_{D3})$ |
| 925 — n | $S_{An} = f(S_{An-1}, A_{An})$ | $S_{Bn} = f(S_{Bn-1}, stay_{B'}, S_{An-1}, A_{Bn})$ | $S_{Cn} = f(S_{Cn-1}, stay_{C'}, S_{Bn-1}, leave_{B'}, A_{Cn})$ | $S_{Dn} = f(S_{Dn-1}, stay_D, S_{Cn-1}, leave_C, A_{Dn})$ | $S_{Nn} = f(S_{Dn-1}, leave_N, A_{Nn})$ | select "Brown" by mouse

Correction

1325 those who |Brown| to meet this those who Brown to meet this
those who Brown's meet this
those who grabs a meet this
those who Browns meet this
those who browns meet this
those who grabs meet this
those who Brown to meet is
those who browns and meet this
those who Brown's meat is
those who Brown's meet is

1335

FIG. 13F select "to meet this" by mouse

Correction those who pronounce|to meet this those who pron to meet this
those who prone to meet this
those who pronounce to meet this
those who pronounced to meet this
those who pronouncement to meet this
those who pronouncements to meet this
those who pronatalist to meet is
those who pronate to meet this
those who pronated to meet this
those who pronates to meet this

SPEECH RECOGNITION USING WORD-IN-PHRASE COMMAND

TECHNICAL FIELD

This invention relates to computer-implemented speech recognition, and more particularly, to speech recognition using a word-in-phrase command.

BACKGROUND

A speech recognition system analyzes a user's speech to determine what the user said. Most speech recognition systems are frame-based. In a frame-based system, a processor divides a signal descriptive of the speech to be recognized into a series of digital frames, each of which corresponds to a small time increment of the speech.

A speech recognition system may be a "discrete" system that recognizes discrete words or phrases but which requires the user to pause briefly between each discrete word or phrase. Alternatively, a speech recognition system may be a "continuous" system that can recognize spoken words or phrases regardless of whether the user pauses between them. Continuous speech recognition systems typically have a higher incidence of recognition errors in comparison to discrete recognition systems due to complexities of recognizing continuous speech.

In general, the processor of a continuous speech recognition system analyzes "utterances" of speech. An utterance includes a variable number of frames and corresponds, for example, to a period of speech followed by a pause of at least a predetermined duration.

The processor determines what the user said by finding acoustic models that best match the digital frames of an utterance, and by identifying text that corresponds to those acoustic models. An acoustic model may correspond to a word, phrase or command from a vocabulary. An acoustic model also may represent a sound, or phoneme, that corresponds to a portion of a word. Collectively, the constituent phonemes for a word represent the phonetic spelling of the word. Acoustic models also may represent silence and various types of environmental noise. In general, the processor may identify text that corresponds to the best-matching acoustic models by reference to phonetic word models in an active vocabulary of words and phrases.

The words or phrases corresponding to the best matching acoustic models are referred to as recognition candidates. The processor may produce a single recognition candidate for an utterance, or may produce a list of recognition candidates.

SUMMARY

In one general aspect, a method of computer-implemented speech recognition includes performing speech recognition on an utterance to produce a recognition result for the utterance, and determining if the word closely corresponds to a portion of the phrase. The recognition result includes a command, a word, and a phrase. A speech recognition result is produced if the word closely corresponds to a portion of the phrase.

Implementations may include one or more of the following features. For example, the recognition result may include "写作<phrase>的<word>" in the Chinese language. Or, the recognition result may include "Write <word> as in <phrase>" in the English language.

The method may also include extracting the word and the phrase from the recognition result. Determining if the word closely corresponds to a portion of the phrase may include a determining if the word matches a substring of the phrase. Producing the speech recognition result may include producing the word.

Determining if the word closely corresponds to a portion of the phrase may include determining if the word sounds similar to a substring of the phrase. Producing the speech recognition result may include producing the substring of the phrase that sounds similar to the word.

The method may also include producing no speech recognition result if the word does not correspond to a portion of the phrase.

The method may also include determining if previously recognized text has been selected. The method may further include replacing selected text with the produced speech recognition result if text has been selected. Moreover, the method may include inserting the produced speech recognition result into the text at a predetermined location if text has not been selected.

The word-in-phrase command provides a natural way for Chinese users to disambiguate a homophone word by putting it in a larger phrase that is less ambiguous.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 8A, 8B and 8C are state graphs representing nodes of the lexical tree of FIG. 5.

FIGS. 9 and 10 are charts of scores corresponding to the states of the state graphs of FIGS. 8A, 8B and 8C.

Like reference symbols in the various drawings indicate like elements.

DETAILED DESCRIPTION

A speech recognition system uses a word-in-phrase command in a recognition candidate to disambiguate homophone errors. As background information for the discussion of disambiguation of homophones, a speech recognition system that does not use a word-in-phrase command is discussed with reference to FIGS. 1–13N.

Figure 1:
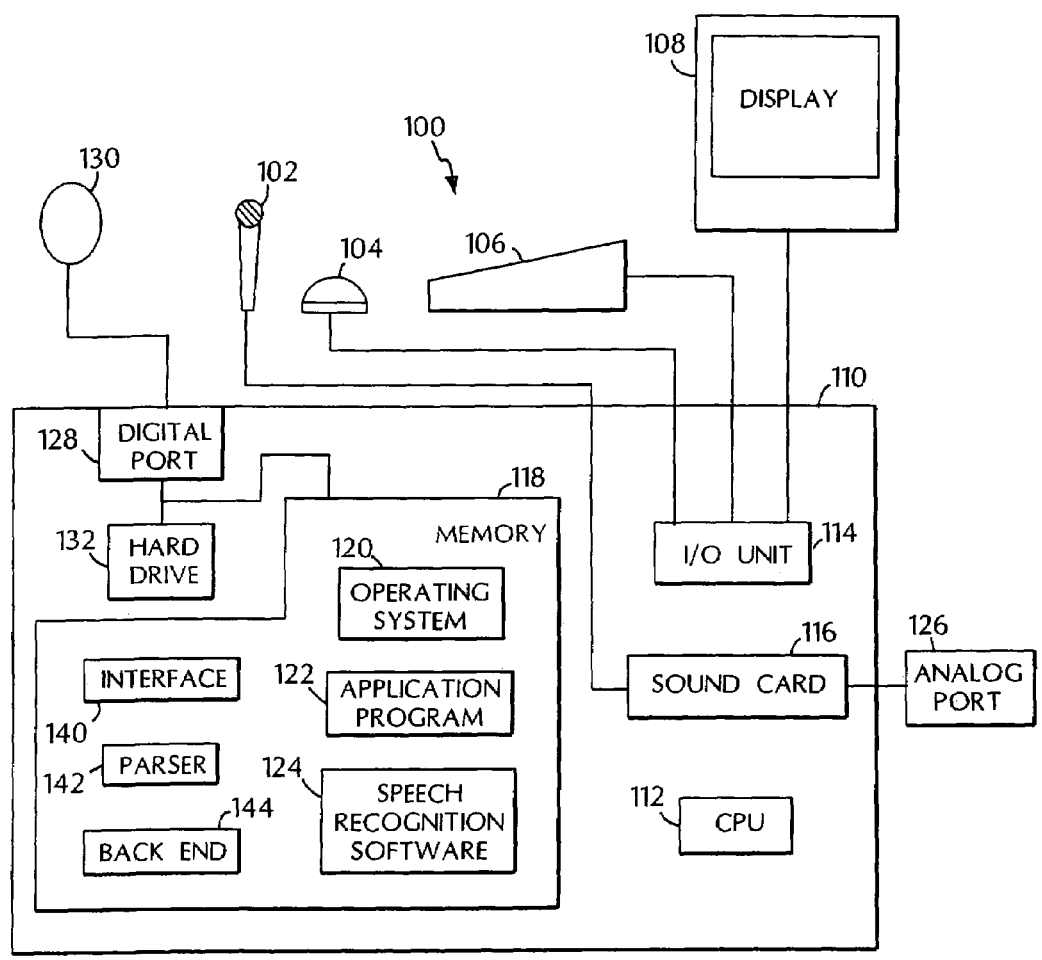
FIG. 1 is a block diagram of a speech recognition system.

Referring to FIG. 1, a speech recognition system 100 includes input/output (I/O) devices (for example, microphone 102, mouse 104, keyboard 106, and display 108) and a computer 110 having a processor 112, an I/O unit 114, and a sound card 116. A memory 118 stores data and programs such as an operating system 120, an application program 122 (for example, a word processing program), and speech recognition software 124.

A computer suitable for one implementation of the system includes a 700 MHz Pentium™ processor, 128 MB memory, 12 GB of available hard drive space. The computer may run Windows 95, Windows 98, Windows2000, or Windows NT 4.0 as an operating system or any other suitable operating system.

The computer 110 may be used for traditional speech recognition. In this case, the microphone 102 receives the user's speech and conveys the speech, in the form of an analog signal, to the sound card 116, which in turn passes the signal through an analog-to-digital (A/D) converter to transform the analog signal into a set of digital samples. Under control of the operating system 120 and the speech recognition software 124, the processor 112 identifies utterances in the user's continuous speech. Utterances are separated from one another by a pause having a sufficiently large, predetermined duration (for example, 160–250 milliseconds). Each utterance may include one or more words of the user's speech.

The system also may include an analog recorder port 126 and/or a digital recorder port 128. The analog recorder port 126 is connected to the sound card 116 and is used to transmit speech recorded using an analog or digital handheld recorder to the sound card. The analog recorder port 126 may be implemented using a line in port. The hand-held recorder is connected to the port using a cable connected between the line in port and a line out or speaker port of the recorder. The analog recorder port 126 may be implemented as a microphone positioned so as to be next to the speaker of the hand-held recorder when the recorder is inserted into the port 126, and also may be implemented using the microphone 102. Alternatively, the analog recorder port 126 may be implemented as a tape player that receives a tape recorded using a hand-held recorder and transmits information recorded on the tape to the sound card 116.

The digital recorder port 128 may be implemented to transfer a digital file generated using a hand-held digital recorder 130. This file may be transferred directly into memory 118, or to a storage device such as hard drive 132. The digital recorder port 128 may be implemented as a storage device (for example, a floppy drive or CD-ROM drive) of the computer 110.

To implement the speech recognition and processing functions of the system 100, the computer 110 runs interface software 140, the speech recognition software 124, a parser 142, and back-end software 144. Dragon NaturallySpeaking Preferred Edition 3.1, available from Dragon Systems, Inc. of Newton, Mass., offers one example of suitable speech recognition software. The interface software 140 provides a user interface for controlling the transfer of data from the digital recorder and the generation of action items for use by the back-end software 144. In general, the user interface may be controlled using input devices such as a mouse or keyboard, or using voice commands processed by the speech recognition software 124.

After transferring data from the recorder, the interface software 140 provides the digital samples for an action item to the speech recognition software 124. If the digital samples have been stored using compression techniques, the interface software 140 decompresses them prior to providing them to the speech recognition software. In general, the speech recognition software analyzes the digital samples to produce a sequence of text, and provides this sequence to the interface software 140. The interface software 140 then transfers the text and the associated time stamp, if any, to the parser 142, which processes the text in conjunction with the time stamp to generate a parsed version of the action item. The parser returns the parsed action item to the interface software, which displays it to the user. After any editing by the user, and with user approval, the interface software then transfers the action item to the appropriate back-end software 144. An example of back-end software with which the system works is personal information management software, such as Microsoft Outlook, which is available from Microsoft Corporation of Redmond, Wash. Other suitable back-end software includes contact management software, time management software, expense reporting applications, electronic mail programs, and fax programs.

Figure 2:
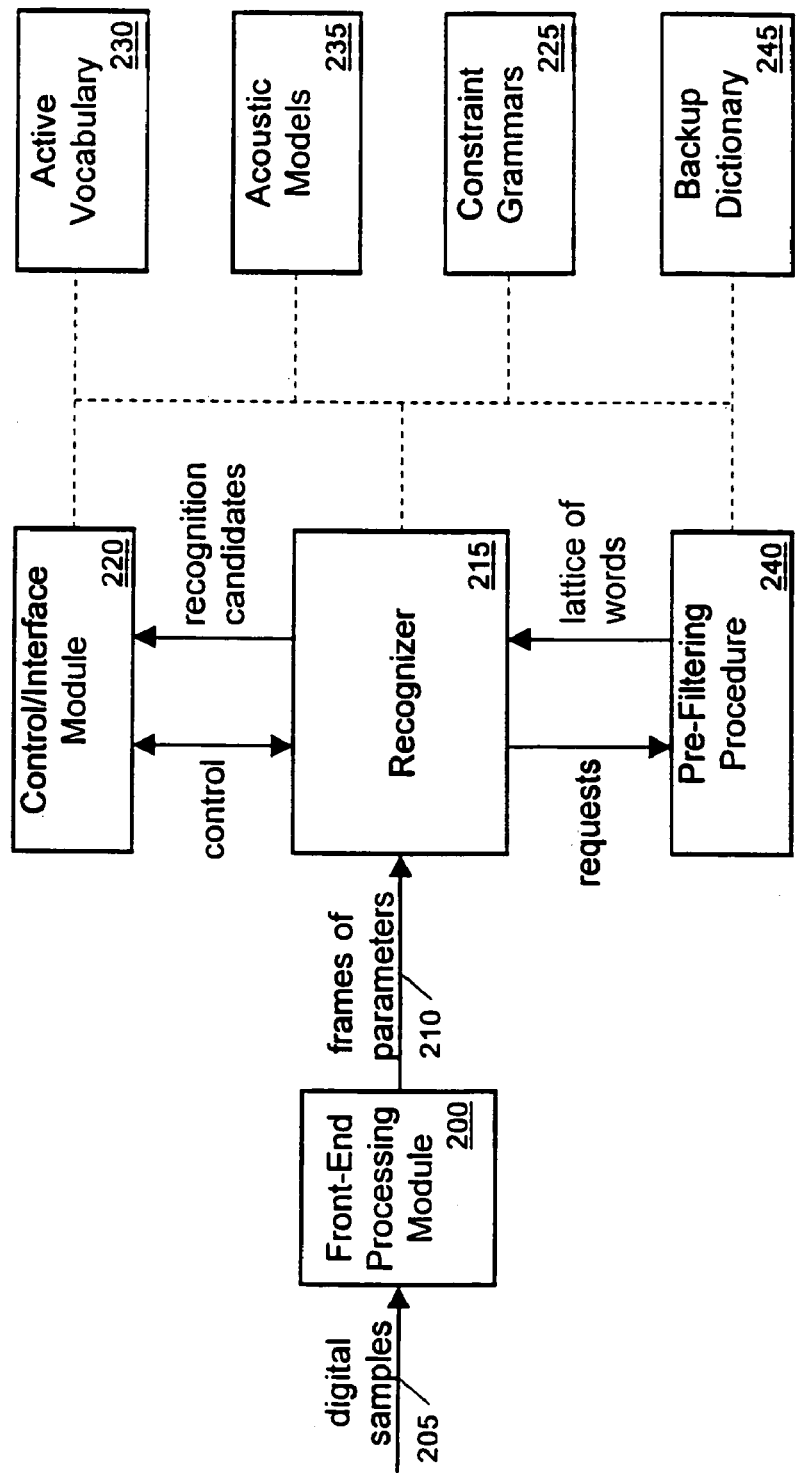
FIG. 2 is a block diagram of speech recognition software of the system of FIG. 1.

FIG. 2 illustrates components of the speech recognition software 124. For ease of discussion, the following description indicates that the components carry out operations to achieve specified results. However, it should be understood that each component actually causes the processor 112 to operate in the specified manner.

Initially, a front end processing module 200 converts the digital samples 205 from the sound card 116 (or from the digital recorder port 128) into frames of parameters 210 that represent the frequency content of an utterance. Each frame includes 24 parameters and represents a short portion (for example, 10 milliseconds) of the utterance.

Figure 3:
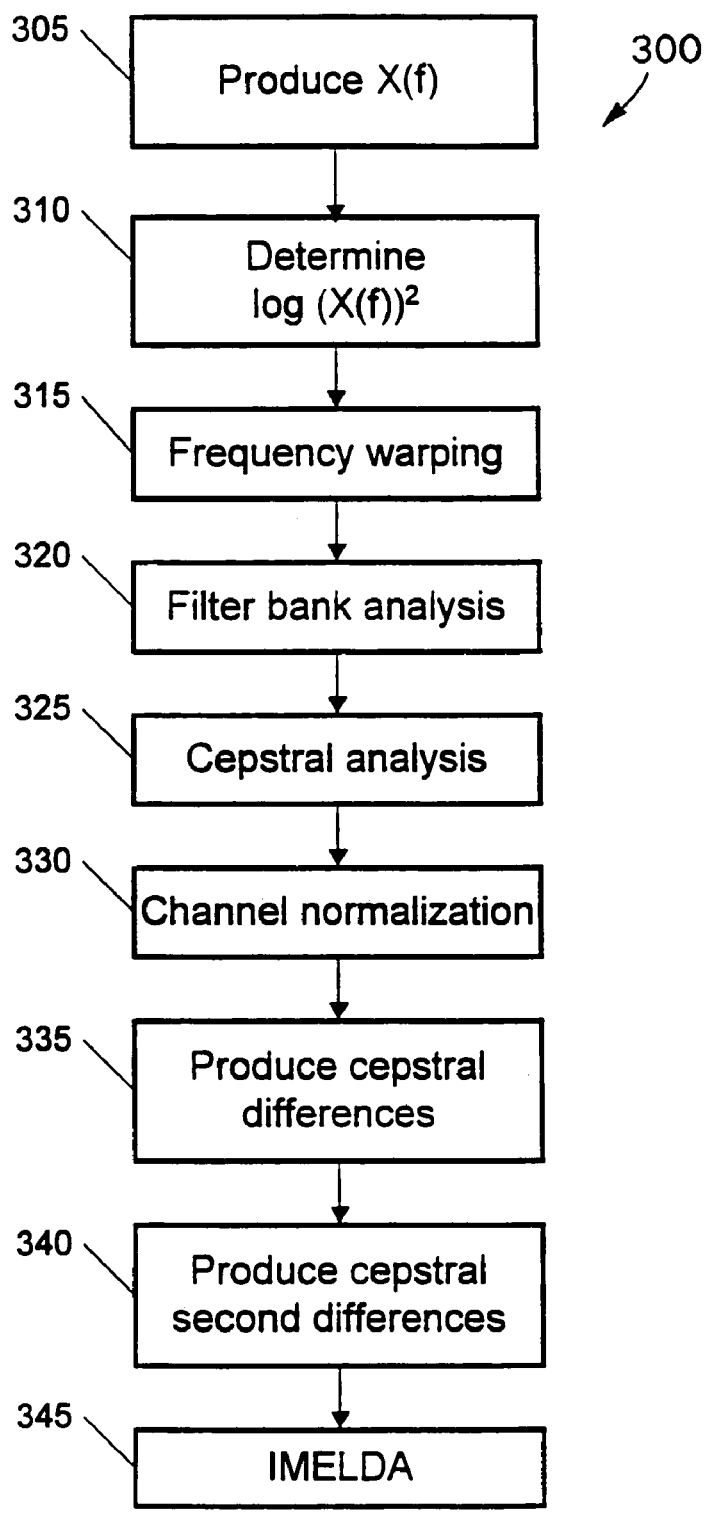
FIG. 3 is a flow chart of a signal processing procedure performed by the software of FIG. 2.

As shown in FIG. 3, the front end processing module 200 produces a frame from digital samples according to a procedure 300. The module first produces a frequency domain representation X(f) of the portion of the utterance by performing a Fast Fourier Transform (FFT) on the digital samples (step 305). Next, the module determines $\log(X(f))^2$ (step 310). The module may then perform frequency warping (step 315) and a filter bank analysis (step 320) to achieve speaker normalization. See S. Wegmann et al., "Speaker Normalization on Conversational Speech," Proc. 1996 ICASSP, pp. I.339–I.341, which is incorporated by reference.

From the normalized results, the module performs cepstral analysis to produce twelve cepstral parameters (step 325). The module generates the cepstral parameters by performing an inverse cosine transformation on the logarithms of the frequency parameters. Cepstral parameters and cepstral differences (described below) have been found to emphasize information important to speech recognition more effectively than do the frequency parameters. After performing channel normalization of the cepstral parameters (step 330), the module produces twelve cepstral differences (that is, the differences between cepstral parameters in successive frames) (step 335) and twelve cepstral second differences (that is, the differences between cepstral differences in successive frames) (step 340). Finally, the module performs an IMELDA linear combination transformation to select the twenty-four most useful parameters from the twelve cepstral parameters, the twelve cepstral differences, and the twelve cepstral second differences (step 345).

Referring again to FIG. 2, a recognizer 215 receives and processes the frames of an utterance to identify text corresponding to the utterance. The recognizer entertains several hypotheses about the text and associates a score with each hypothesis. The score reflects the probability that a hypothesis corresponds to the user's speech. For ease of processing, scores are maintained as negative logarithmic values. Accordingly, a lower score indicates a better match (a high probability) while a higher score indicates a less likely match (a lower probability), with the likelihood of the match decreasing as the score increases. After processing the utterance, the recognizer provides the best-scoring hypotheses to the control/interface module 220 as a list of recognition candidates, where each recognition candidate corresponds to a hypothesis and has an associated score. Some recognition candidates may correspond to text while other recognition candidates correspond to commands. Commands may include words, phrases, or sentences.

The recognizer 215 processes the frames 210 of an utterance in view of one or more constraint grammars 225. A constraint grammar, also referred to as a template or restriction rule, may be a limitation on the words that may correspond to an utterance, a limitation on the order or grammatical form of the words, or both. For example, a constraint grammar for menu-manipulation commands may include only entries from the menu (for example, "file", "edit") or command words for navigating through the menu (for example, "up", "down", "top", "bottom"). Different constraint grammars may be active at different times. For example, a constraint grammar may be associated with a particular application program 122 and may be activated when the user opens the application program and deactivated when the user closes the application program. The recognizer 215 discards any hypothesis that does not comply with an active constraint grammar. In addition, the recognizer 215 may adjust the score of a hypothesis associated with a particular constraint grammar based on characteristics of the constraint grammar.

Figure 4A:
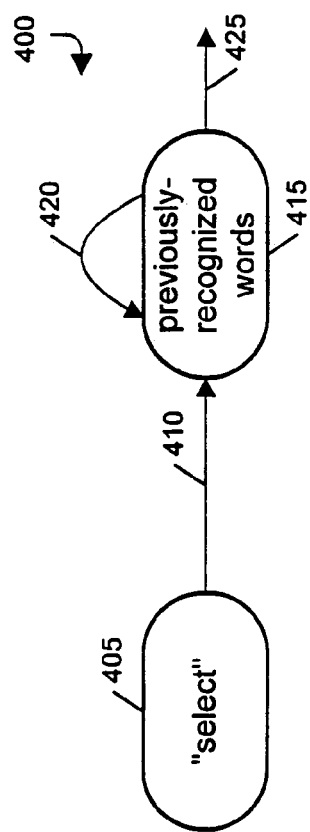
FIGS. 4A and 4B are state diagrams of a constraint grammar.
Figure 4B:
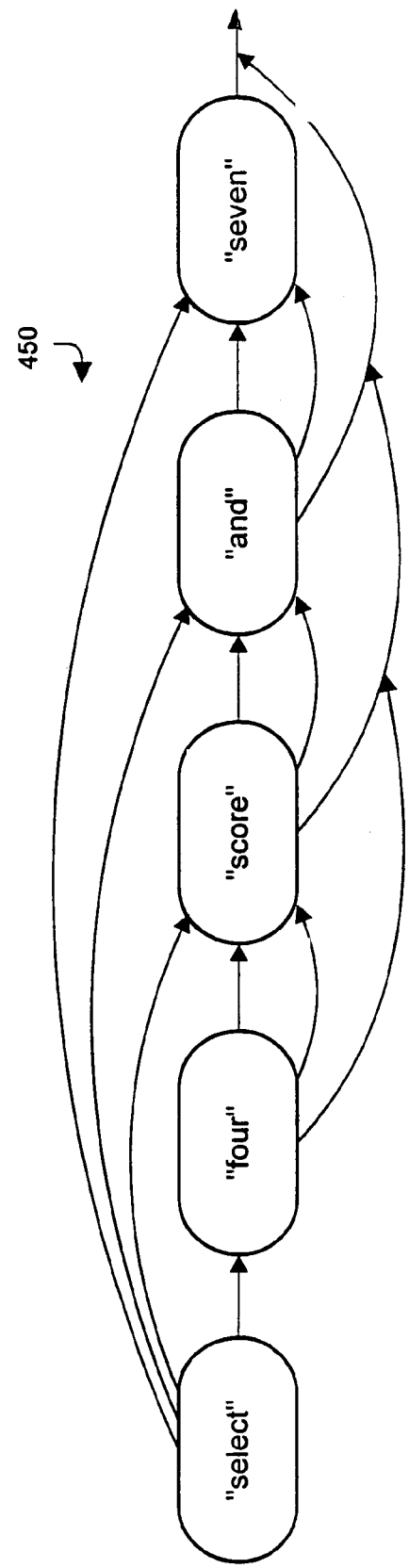

FIG. 4A illustrates an example of a constraint grammar for a "select" command used to select previously recognized text. As shown, a constraint grammar may be illustrated as a state diagram 400. The "select" command includes the word "select" followed by one or more previously-recognized words, with the words being in the order in which they were previously recognized. The first state 405 of the constraint grammar indicates that the first word of the select command must be "select". After the word "select", the constraint grammar permits a transition along a path 410 to a second state 415 that requires the next word in the command to be a previously-recognized word. A path 420, which returns to the second state 415, indicates that the command may include additional previously-recognized words. A path 425, which exits the second state 415 and completes the command, indicates that the command may include only previously-recognized words. FIG. 4B illustrates the state diagram 450 of the constraint grammar for the select command when a previously-recognized utterance is "four score and seven". This state diagram could be expanded to include words from additional utterances. The "select" command and techniques for generating its constraint grammar are described further in U.S. Pat. No. 5,794,189, titled "CONTINUOUS SPEECH RECOGNITION" and issued Aug. 11, 1998, which is incorporated by reference.

The constraint grammar also may be expressed in Backus-Naur Form (BNF) or Extended BNF (EBNF). In EBNF, the grammar for the "Select" command is:

```
<recognition result> ::= Select <words>,
where
    <words> ::= [PRW¹[PRW²[PRW³ . . . PRWⁿ]]] |
    [PRW²[PRW³ . . . PRWⁿ]] | . . . [PRWⁿ],
    "PRWⁱ" is the previously-recognized word i,
    [ ] means optional,
    < > means a rule,
    | means an OR function, and
    ::= means "is defined as" or "is".
```

As illustrated in FIGS. 4A and 4B, this notation indicates that "select" may be followed by any ordered sequence of previously-recognized words. This grammar does not permit optional or alternate words. In some instances, the grammar may be modified to permit optional words (for example, an optional "and" to permit "four score and seven" or "four score seven") or alternate words or phrases (for example, "four score and seven" or "eighty seven"). Constraint grammars are discussed further in U.S. Pat. No. 5,799,279, titled "CONTINUOUS RECOGNITION OF SPEECH AND COMMANDS" and issued Aug. 25, 1998, which is incorporated by reference.

Another constraint grammar 225 that may be used by the speech recognition software 124 is a large vocabulary dictation grammar. The large vocabulary dictation grammar identifies words included in the active vocabulary 230, which is the vocabulary of words known to the software. The large vocabulary dictation grammar also indicates the frequency with which words occur. A language model associated with the large vocabulary dictation grammar may be a unigram model that indicates the frequency with which a word occurs independently of context, or a bigram model that indicates the frequency with which a word occurs in the context of a preceding word. For example, a bigram model may indicate that a noun or adjective is more likely to follow the word "the" than is a verb or preposition.

Other constraint grammars 225 include an in-line dictation macros grammar for dictation commands, such as "CAP" or "Capitalize" to capitalize a word and "New-Paragraph" to start a new paragraph; the select X Y Z grammar discussed above and used in selecting text; an error correction commands grammar; a dictation editing grammar; an application command and control grammar that may be used to control a particular application program 122; a global command and control grammar that may be used to control the operating system 120 and the speech recognition software 124; a menu and dialog tracking grammar that may be used to manipulate menus; and a keyboard control grammar that permits the use of speech in place of input devices, such as the keyboard 106 or the mouse 104.

The active vocabulary 230 uses a pronunciation model in which each word is represented by a series of phonemes that make up the phonetic spelling of the word. Each phoneme may be represented as a triphone that includes three nodes. A triphone is a context-dependent phoneme. For example, the triphone "abc" represents the phoneme "b" in the context of the phonemes "a" and "c", with the phoneme "b" being preceded by the phoneme "a" and followed by the phoneme "c".

One or more vocabulary files may be associated with each user. The vocabulary files contain all of the words, pronunciations, and language model information for the user.

Dictation and command grammars may be split between vocabulary files to optimize language model information and memory use, and to keep each single vocabulary file under a size limit, for example, 64,000 words. There also is a set of system vocabularies.

Separate acoustic models 235 are provided for each user of the system. Initially, speaker-independent acoustic models of male or female speech are adapted to a particular user's speech using an enrollment program. The acoustic models may be further adapted as the system is used. The acoustic models are maintained in a file separate from the active vocabulary 230.

The acoustic models 235 represent phonemes. In the case of triphones, the acoustic models 235 represent each triphone node as a mixture of Gaussian probability density functions ("PDFs"). For example, node "i" of a triphone "abc" may be represented as $ab^ic$:

$$ab^ic = \sum_k w_k N(\mu_k, c_k),$$

where each $w_k$ is a mixture weight, $$\sum_k w_k = 1,$$

$\mu_k$ is a mean vector for the probability density function ("PDF") $N_k$, and $c_k$ is the covariance matrix for the PDF $N_k$. Like the frames in the sequence of frames, the vectors $\mu_k$ each include twenty four parameters. The matrices $c_k$ are twenty four by twenty four matrices. Each triphone node may be represented as a mixture of up to, for example, sixteen different PDFs.

A particular PDF may be used in the representation of multiple triphone nodes. Accordingly, the acoustic models 235 represent each triphone node as a collection of mixture weights $w_k$ associated with up to sixteen different PDFs $N_k$ and separately represent each PDF $N_k$ using a mean vector $\mu_k$ and a covariance matrix $c_k$. Use of a particular PDF to represent multiple triphone nodes permits the models to include a smaller number of PDFs than would be required if each triphone node included entirely separate PDFs. Since the English language may be roughly represented using 43 different phonemes, there may be up to 79,507 (43³) different triphones, which would result in a huge number of PDFs if each triphone node were represented by a separate set of PDFs. Representing multiple nodes with common PDFs also may remedy or reduce a data sparsity problem that results because some triphones (for example, "tzp" in the English language) rarely occur. These rare triphones may be represented by having closely-related triphones share the same set of PDFs.

A large vocabulary dictation grammar may include multiple dictation topics (for example, "medical" or "legal"), each having its own vocabulary file and its own language model. A dictation topic includes a set of words that represents the active vocabulary 230. In a typical example, a topic may include approximately 30,000 words that are considered for normal recognition.

A complete dictation vocabulary consists of the active vocabulary 230 plus a backup vocabulary 245. The backup vocabulary may include files that contain user-specific backup vocabulary words and system-wide backup vocabulary words.

User-specific backup vocabulary words include words that a user has created while using the speech recognition software. These words are stored in vocabulary files for the user and for the dictation topic, and are available as part of the backup dictionary for the dictation topic regardless of user, and to the user regardless of which dictation topic is being used. For example, if a user is using a medical topic and adds the word "ganglion" to the dictation vocabulary, any other user of the medical topic will have immediate access to the word "ganglion". In addition, the word will be written into the user-specific backup vocabulary. Then, if the user says "ganglion" while using a legal topic, the word "ganglion" will be available during correction from the backup dictionary.

In addition to the user-specific backup vocabulary noted above, there is a system-wide backup vocabulary. The system-wide backup vocabulary contains all the words known to the system, including words that may currently be in an active vocabulary.

Referring again to FIG. 2, the recognizer 215 may operate in parallel with a pre-filtering procedure 240. Upon initiating processing of an utterance, the recognizer 215 requests from the pre-filtering procedure 240 a list of words that may have been spoken as the first word of the utterance (that is, words that may correspond to the first and subsequent frames of the utterance). The pre-filtering procedure 240 performs a coarse comparison of the sequence of frames with the active vocabulary 230 to identify a subset of the vocabulary for which a more extensive comparison using the recognizer is justified.

Figure 5:
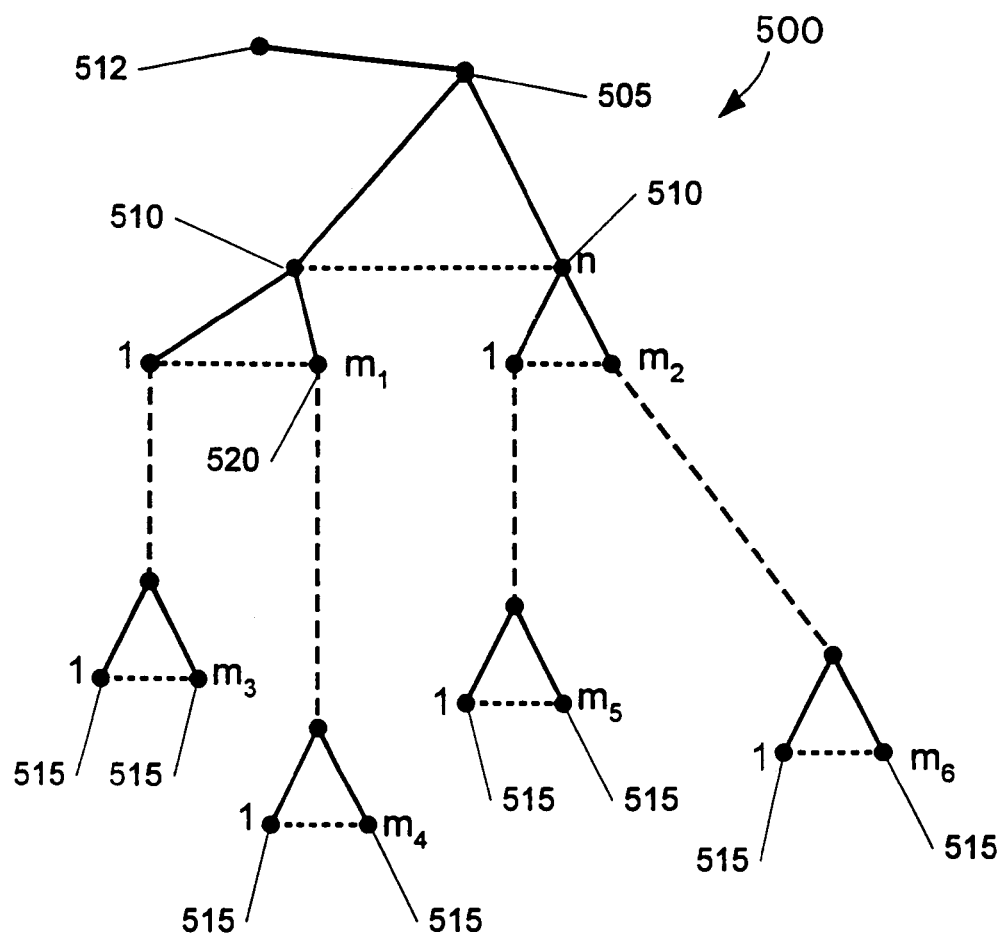
FIG. 5 is a graph of a lexical tree.
Figure 6:
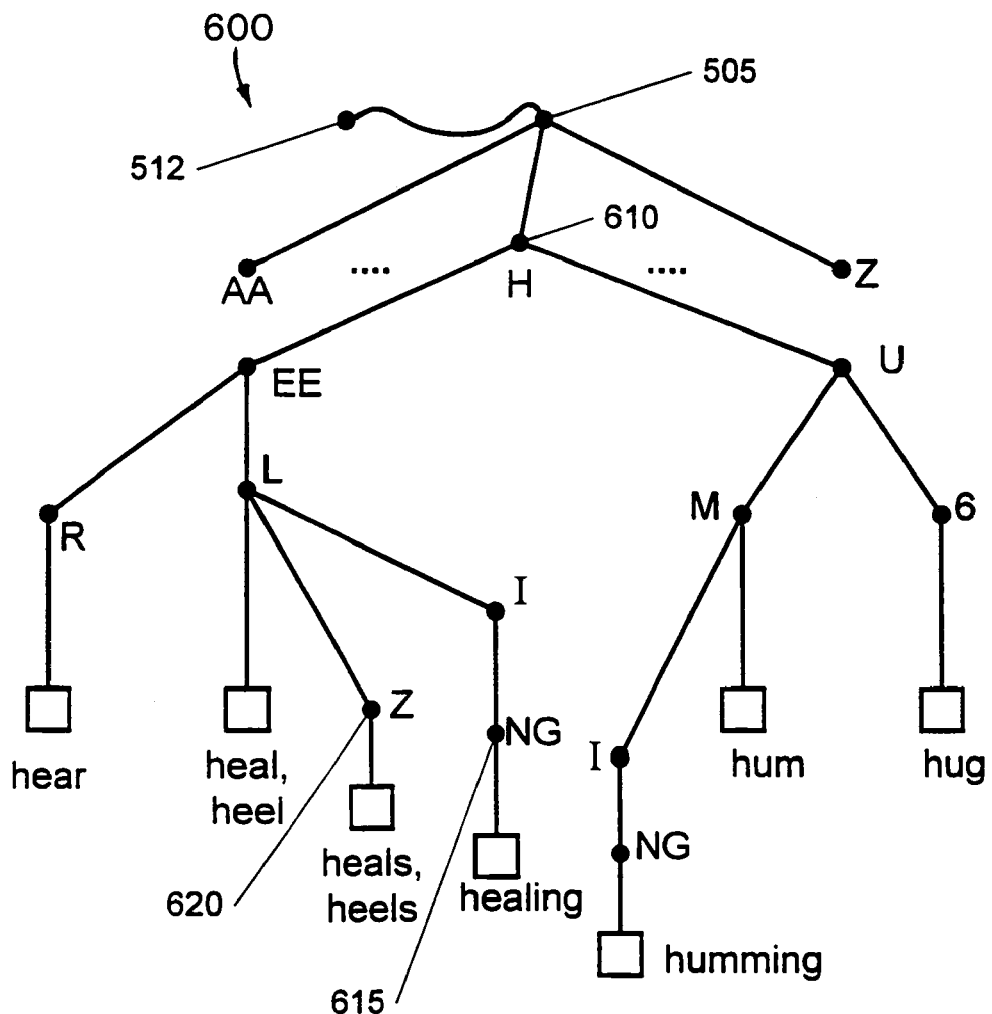
FIG. 6 is a graph of a portion of the lexical tree of FIG. 5.

Referring to FIGS. 5 and 6, the pre-filtering procedure 240 uses a lexical tree 500 that is initialized before processing begins. The lexical tree represents the active vocabulary 230 based on the phonetic relationships between words in the vocabulary. The lexical tree includes a root node 505 that represents new words entering the lexical tree. From the root node 505, the tree expands to a group 510 of nodes that correspond to phonemes with which words start. A silence node 512 that represents silence also may be reached from the root node 505.

Each node in the group 510 represents a phoneme that appears at the beginning of one or more words. For example, in the portion 600 of the lexical tree 500 illustrated in FIG. 6, a node 610 corresponds to all words in the vocabulary that start with the phoneme "H". Together, the nodes in the group 510 include representations of the starting phoneme of every word in the vocabulary.

The lexical tree continues to expand until it reaches leaf nodes 515 that represent the actual words of the vocabulary. For example, as indicated by the square marker, leaf node 615 of FIG. 6 corresponds to the word "healing". An internal node of the tree also may represent a word of the vocabulary. For example, the node 520 might represent a particular vocabulary word in addition to representing the first two phonemes of other vocabulary words. Similarly, the leaf node 620 of FIG. 6 corresponds to the words "heal" and "heel" while also corresponding to the first three phonemes of the words "heals", "heels" and "healing". Node 620 also illustrates that, since multiple words may have the same phonetic spelling, a leaf node may correspond to more than one word. As illustrated in FIG. 6, leaf nodes may appear at different levels within the lexical tree. Leaf nodes also may correspond to commands. For example, a leaf node may correspond to the word "select" and to the command "SELECT". As noted above, commands may be associated with particular constraint grammars 225.

Figure 7:
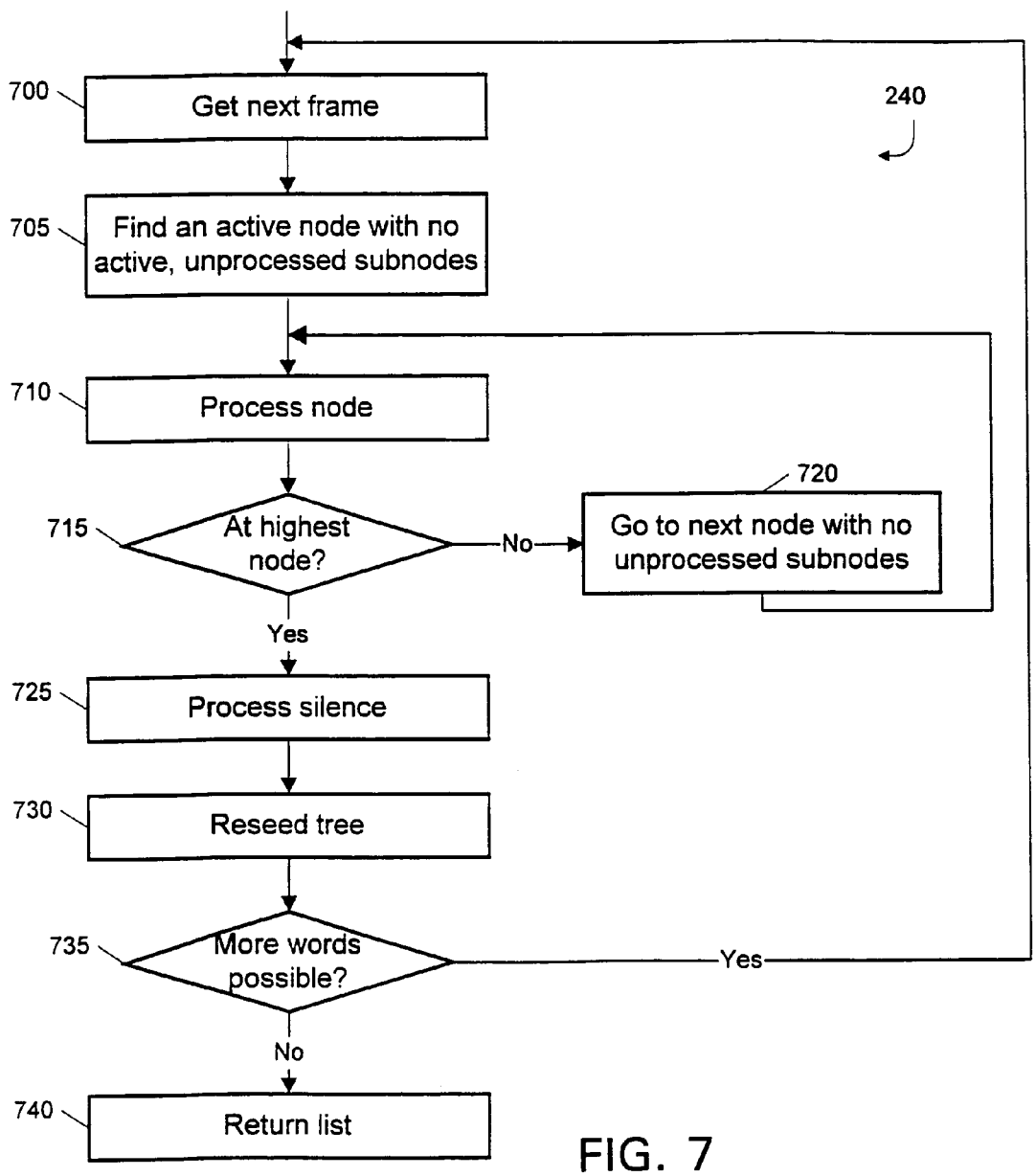
FIG. 7 is a flow chart of a pre-filtering procedure performed by the software of FIG. 2.

Operation of the pre-filtering procedure 240 is illustrated in FIG. 7. The pre-filtering procedure begins by retrieving the next frame of parameters for an utterance (step 700). Immediately after initialization, the next frame will be the first frame for the utterance. Thereafter, the next frame will be the frame following the last frame that was processed by the pre-filtering procedure when the pre-filtering procedure was last called. The pre-filtering procedure does not reinitialize the lexical tree between requests for list of words. Accordingly, the state of the lexical tree when a list of words is requested corresponds to the state of the lexical tree after a previous list of words was returned.

After retrieving a frame of data, the pre-filtering procedure finds an active node in the tree with no unprocessed active successors (step 705). Successors of a node also may be referred to as subnodes of the node. When the lexical tree is initialized, the silence node 512 is the only active node.

Next, the pre-filtering procedure processes the current node (step 710) according to a node-processing procedure 1100 that is discussed below with reference to FIG. 11. The node-processing procedure determines whether the node should spawn additional active nodes and whether the node should be rendered inactive. If the node is a leaf node, the node-processing procedure also determines whether the word corresponding to the node should be added to a word list for a time associated with the node.

After processing the node (step 710), the pre-filtering procedure determines whether the node is the highest node in the tree (that is, the root node) (step 715). If the node is not the highest node, then the pre-filtering procedure goes to the next node having no unprocessed active subnodes (step 720) and processes that node (step 710). When searching for the next node to process, the pre-filtering procedure considers inactive nodes having active subnodes or active siblings.

If the processed node is the highest active node (step 715), then the pre-filtering procedure processes the silence node 512 (step 725). In general, the silence node is processed by comparing a frame to a model for silence and adding the resulting score to the minimum of the current score for the silence node and the score for the root node 505.

Next, the pre-filtering procedure reseeds the lexical tree (step 730). The pre-filtering procedure reseeds the tree whenever the silence node 512 is active or a word was produced by a leaf node of the lexical tree, regardless of whether the word was added to the list of words. The pre-filtering procedure reseeds the tree by replacing the score for the root node 505 with the minimum of the score for the silence node 512 and the scores for any words produced by leaf nodes of the lexical tree for the current frame. If the silence node is inactive and no leaf node has produced a word, then the pre-filtering procedure replaces the score for the root node 505 with a bad score (that is, a score having a value larger than a pruning threshold).

Next, the pre-filtering procedure determines whether more words may be added to the word list for the requested time (step 735). If there are no active nodes in the lexical tree corresponding to speech that started at, before, or slightly after the start time for which the list was requested, and if the last frame to be processed corresponds to a time that is slightly a after the start time for which the list was requested, then no more words may be added to the word list. A word produced by the lexical tree is added to the list of words corresponding to the start time of the word and to lists of words corresponding to times that precede and follow the start time of the word. It is for this reason that the pre-filtering procedure waits until there are no active nodes in the tree corresponding to speech that started slightly after the start time for the list of words. If more words may be added, then the pre-filtering procedure retrieves the next frame of parameters (step 700) and repeats the steps discussed above.

If words cannot be added to the word list (step 735), then the pre-filtering procedure returns the word list (step 740) to the recognizer 215. If the word list includes more than a predefined number of words, then the pre-filtering procedure removes words from the list prior to returning the list. The pre-filtering procedure removes the words that are least likely to correspond to the user's speech and removes enough words to reduce the number of words on the list to the predefined number. The procedure also deletes any lists of words for times prior to the requested start time.

Each node of the lexical tree 500 (FIG. 5) represents a sequence of states for a particular phoneme. For example, FIG. 8A illustrates a node 800 that includes a first state 805, a second state 810, and a third state 815. A comparison with a frame of parameters may cause the score in a particular state to remain in the state (through a path 820). A score remains in the state when the score, after being adjusted based on a comparison with a model for the state, is better than a score passed from a preceding state or node, or when no score is passed from a preceding state or node. The comparison also may cause the score to be passed to a subsequent state through a path 825. A score is passed to a subsequent state when the score, after being adjusted based on a comparison with a model for the subsequent state, is better than the score in the subsequent state, or when no score is associated with the subsequent state. The score for the third state 815 may be passed to one or more subsequent nodes through a path 830.

Referring to FIG. 8B, the node 512 that corresponds to silence is represented by a single state 840. Each comparison with a frame of parameters may cause a score in the node to remain in the state 840 (through the path 845) and also may cause the score to be passed to the root node 505 through a path 850.

Referring to FIG. 8C, the root node 505 is represented by a single state 860. Comparison with a frame causes the score in the node to be passed to one or more subsequent nodes (including the silence node 512) through a path 865.

Each state of a node may be represented by four values: a score, a starting time, a leaving penalty, and a staying penalty. The score represents the likelihood that a series of frames has placed the lexical tree in the state (that is, the probability that the series of frames corresponds to the word or portion of a word to which the state corresponds). The scores are maintained as negative logarithmic values.

The starting time identifies the hypothesized time at which the user began to speak the word or words represented by the state. In particular, the starting time identifies the time at which the score associated with the state entered the lexical tree (that is, the time at which the score was passed from the state 840 along the path 850).

The leaving and staying penalties are fixed values associated with the state. The staying penalty is added to any score that stays in the state. The staying penalty is related inversely to the length of the sound represented by the state and to the length of the phoneme represented by the node to which the state belongs. For example, the staying penalty could be proportional to $-\log(1-1/d_{avg})$, where $d_{avg}$ is the average duration, in frames, of the sound represented by the state. Thus, the staying penalty has a relatively large value when the sound corresponding to the state occurs for only a small amount of time and a relatively small value when the sound corresponding to the state occurs for a large amount of time.

The leaving penalty is added to any score that exits the state, and includes a duration component and a language model component. The duration component is related directly to the length of the sound represented by the state and to the length of the phoneme represented by the node to which the state belongs. For example, the duration component of the leaving penalty could be proportional to $-\log(1/d_{avg})$. Thus, the duration component of the leaving penalty has a relatively large value when the sound corresponding to the state occurs for a large amount of time and a relatively small value when the sound corresponding to the state occurs for a small amount of time.

The language model components of the leaving penalties for all states in a particular node together represent a language model score for the phoneme associated with that node. The language model score represents the likelihood that a word including the phoneme will occur in speech. The language model score included in the leaving penalties for a node is the increase in the best language model score for the branch of the lexical tree that begins with the node relative to the branch of the lexical tree that begins with the node's parent.

The following discussion assumes that there are no leaving or staying penalties associated with the state 840 or the state 860. The same result could be achieved by setting the leaving and staying penalties for states 840 and 860 equal to zero. The following discussion also assumes that the first frame is the first frame that may correspond to speech instead of silence.

FIG. 9 provides a simplified example of how scores propagate through the lexical tree. Before the first frame is retrieved (row 900), state 840 (which corresponds to silence) has a score of 0 and no other nodes are active. The score of 0 means that there is one hundred percent probability that the system is starting from silence.

After the first frame is retrieved (row 905), the score for the state 840 ($S_{A1}$) is set equal to the acoustic score ($A_{A1}$) resulting from an acoustic match of the first frame with an acoustic model corresponding to the state 840 (that is, the acoustic model for silence). Thus, the score for the state 840 ($S_{A1}$) is set equal to the likelihood that the first frame corresponds to silence.

Retrieval of the first frame also causes the state 805 to become an active state. Assuming that the node 800 corresponds to a phoneme that starts a word, the score for the state 805 ($S_{B1}$) is set equal to the acoustic score ($A_{B1}$) resulting from an acoustic match of the first frame with the acoustic model corresponding to the state 805. Thus, the score for the state 805 ($S_{B1}$) is set equal to the likelihood that the first frame corresponds to the state 805. The starting time for the state 805 is set equal the time associated with the first frame. This value for the starting time indicates that the score at state 805 represents a word that started at a time corresponding to the first frame. The starting time moves with the score as the score propagates through the lexical tree.

After the second frame is retrieved (row 910), the score for the state 840 ($S_{A2}$) is set equal to the sum of the previous score for the state ($S_{A1}$) and the acoustic score ($A_{A2}$) resulting from an acoustic match of the second frame with the acoustic model for silence:

$$S_{A2}=S_{A1}+A_{A2}=A_{A1}+A_{A2}.$$

As noted above, each of the scores corresponds to a negative logarithmic probability. Accordingly, adding scores together corresponds to multiplying the probabilities. Thus, the score for the state 840 ($S_{A2}$) equals the likelihood that both of the first and second frames correspond to silence. This process is repeated for subsequent frames (for example, lines 915 and 920) so that the score for the state 840 at a frame "n" ($S_{An}$) equals:

$$S_{An} = S_{An-1} + A_{An} = \sum_{m=1}^{n} A_{Am}.$$

This expression assumes that the silence node 512 is not reseeded from the root node 505. If reseeding occurs at a frame n, then the value of $S_{An-1}$ would be replaced by the score in the root node 505 for the frame n-1.

After the second frame is retrieved, the score for the state 805 ($S_{B2}$) is set equal to:

$$S_{B2}=\min(S_{B1}+stay_B, S_{A1})+A_{B2},$$

where $A_{B2}$ is the acoustic score resulting from an acoustic match of the second frame with the acoustic model corresponding to state 805 and $stay_B$ is the staying penalty for state 805. The score for state 805 ($S_{B2}$) corresponds to the more likely of two alternatives: (1) the first frame was silence and the second frame was the sound represented by the state 805 or (2) both of the first and second frames were the sound represented by the state 805. The first alternative corresponds to a transition from state 840 to state 805 along the path 850. The second alternative corresponds to a transition from state 805 back to state 805 along path 820. When the first alternative is the more likely, the starting time corresponding to the first frame that was stored previously for the state 805 is replaced by a value corresponding to the second frame. This value indicates that the score at state 805 represents a word that started with the second frame.

After the second frame is retrieved, the state 810 becomes an active state. The score for the state 810 ($S_{C2}$) is set equal to:

$$S_{C2}=S_{B1}+leave_B+A_{C2},$$

where $A_{C2}$ is the acoustic score resulting from an acoustic match of the second frame with the acoustic model corresponding to state 810 and $leave_B$ is the leaving penalty for the state 805. Similarly, $leave_C$ and $leave_D$ are leaving penalties for, respectively, states 810 and 815. The sum of language model components of $leave_B$, $leave_C$ and $leave_D$ represents the language model score for the phoneme represented by the node 800.

The methodology for determining state scores for states other than the silence state can be expressed more generally as:

$$S_{i,j}=\min(S_{i,j-1}+stay_i, S_{i-1,j-1}+leave_{j-1})+A_{i,j},$$

for i greater than zero (where i equals zero corresponds to silence), and with the boundary condition that the score for an inactive state equals infinity or some sufficiently large value. The starting time for the state may be represented as:

$$t_{i,j}=t_{i,j-1} \text{ for } S_{i,j-1}+stay_i \leq S_{i-1,j-1}+leave_{j-1},$$

or $$t_{i,j}=t_{i-1,j-1} \text{ for } S_{i,j-1}+stay_i > S_{i-1,j-1}+leave_{j-1}$$

for i and j greater than zero and with the boundary condition that the time value for a newly active state represents the frame at which the state became active. As previously noted, state scores for the silence state may be determined as:

$$S_{0,j} = S_{0,j-1} + A_{0,j} = \sum_{m=1}^{j} A_{0,m}$$

with the boundary condition that $S_{0,0}$ equals zero. An even more general form, in which the scores are expressed as functions of the various parameters, is illustrated in FIG. 10.

Figure 11:
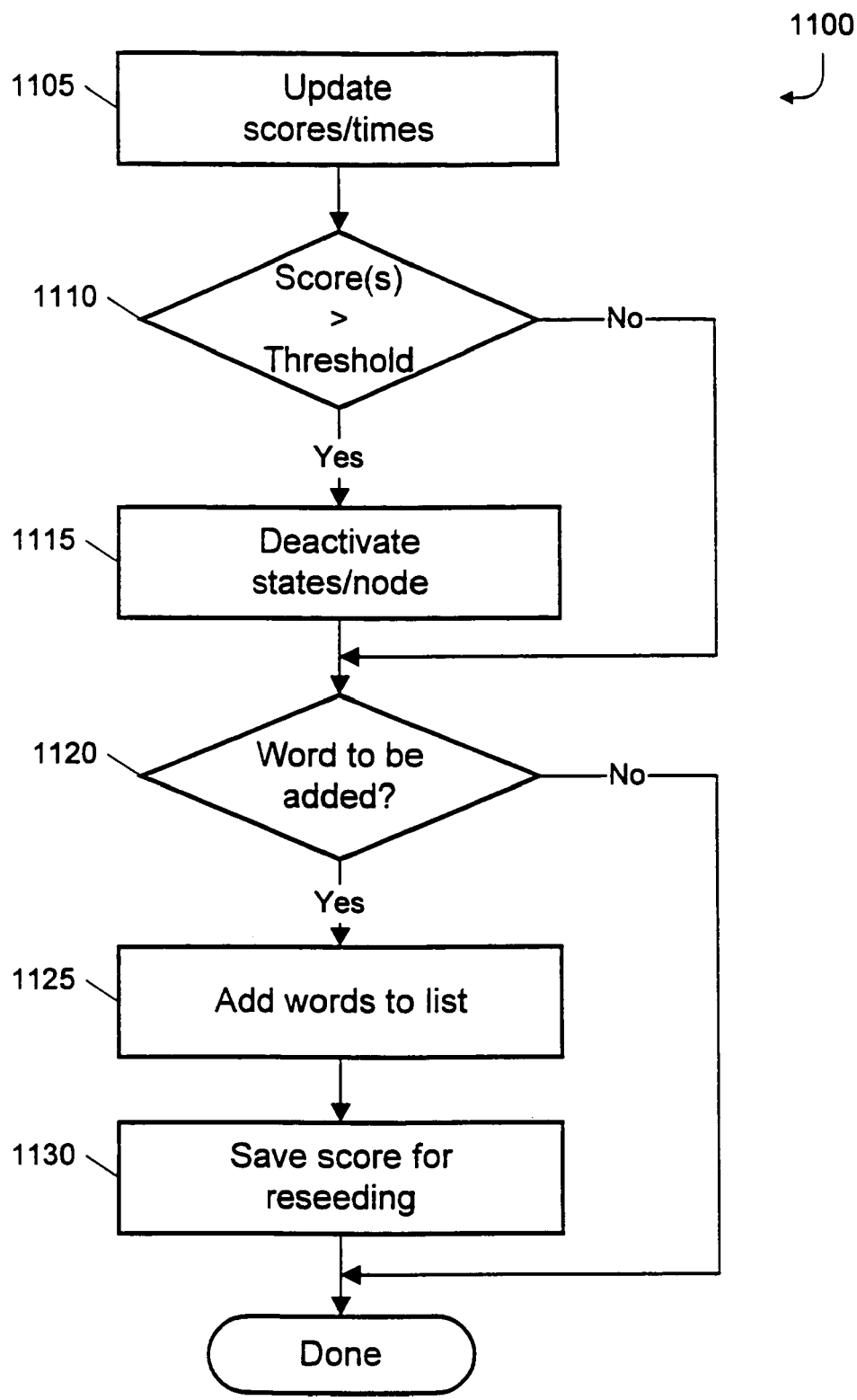
FIG. 11 is a flow chart of a procedure for processing nodes of a lexical tree.

Referring to FIG. 11, a node may be processed according to a node-processing procedure 1100. Initially, the node-processing procedure updates the scores and time values for each state of the node (step 1105). The node-processing procedure updates the scores and time values by generating acoustic scores and using the equations discussed above.

When the last state of the node was active prior to updating the scores for the node, the node-processing procedure uses the score for the last state to generate scores for any inactive subnodes of the node. If the generated score for a subnode does not exceed a pruning threshold, then the node-processing procedure activates that subnode and provides the subnode with the generated score.

Next, the node-processing procedure determines whether the score of any state of the node exceeds the pruning threshold (step 1110). When a score exceeds the pruning threshold, the likelihood that the word represented by the score was spoken is deemed to be too small to merit further consideration. For this reason, the procedure prunes the lexical tree by deactivating any state having a score that exceeds the pruning threshold (step 1115). If every state of the node is deactivated, then the node-processing procedure also deactivates the node. The node-processing procedure may deactivate a node or state by deleting a record associated with the node or state, or by indicating in the record that the node or state is inactive. Similarly, the node-processing procedure may activate a node or state by creating a record and associating the record with the node or state, or by indicating in an existing record that the node or state is active. The procedure may use a dynamic pruning threshold that accounts for variations in the average or best score in the lexical tree at any given time.

Next, the node-processing procedure determines whether a word is to be added to a list of words (step 1120). A word is added to the list of words when the node being processed corresponds to the last phoneme of a word, a score has been propagated out of the last state of the node, and the score is less than a list threshold. Before comparing the score to the list threshold, the node-processing procedure adds a language model score to the score. The language model score corresponds to the difference between the language model score for the word and the incremental language model score that is already included in the score. In general, the list threshold has a lower value than the pruning threshold. If the node being processed corresponds to the last phoneme of multiple words having the same phonetic spelling, then all of the words to which the node corresponds are added to the list of words.

If the noted conditions are met, the node-processing procedure adds the word or words to the list (step 1125). A word is stored in the list of words along with the score propagated out of the last state. If the word is on the list already, then the node-processing procedure stores with the list the better of the score already stored with the list or the score propagated out of the last state. The scores for words in a list of words are returned along with the list of words. The recognizer 215 uses these scores in making the detailed match.

The node-processing procedure also adds the word to lists of words for times that precede or follow the starting time to account for possible inaccuracies in the starting time of the word that may result from selecting the better of a score that remains in a state or a score propagated from a prior state. Spreading the word across multiple lists ensures that these inaccuracies will not impinge on the accuracy of the speech recognition system. The node-processing procedure spreads the word across multiple lists based on the length of the word.

After adding a word to the list of words (step 1125), the node-processing procedure saves the score associated with the word as a reseeding score for use in reseeding the tree (step 1130). Production of a word by the lexical tree means that the current frame may correspond to the last frame of the word (with the probability of such a correspondence being reflected by the score associated with the word). This means that the next frame may correspond to the beginning of a word or to silence resulting from a pause between words. The pre-filtering procedure reseeds the tree (step 730 of FIG. 7) to account for this possibility.

For a given frame, multiple nodes may produce words. However, the tree only needs to be reseeded once. To account for this, the node-processing procedure only saves the score associated with a word ($S_w$) as the reseeding score ($S_{RS}$) if the word is the first word to be generated by the tree for the current frame of if the word score is less than the score for all other words generated by previously-processed nodes for the current frame ($S_{RS}'$):

$$S_{RS} = \min(S_W, S_{RS}').$$

Saving only the lowest score (that is, the score indicating the highest probability that the current frame was the last frame of a word) ensures that the tree will be reseeded using the highest probability that the next frame is the first frame of a new word.

To reseed the tree (step 730 of FIG. 7), the pre-filtering procedure activates the root node 505 and associates the minimum of the reseeding score ($S_{RS}$) and the score for the silence node 512 with the root node. During processing of the next frame, the active root node 505 may be used to activate nodes in the group 510 or to activate the silence node 512.

Processing of the node is complete after the node-processing procedure saves a score for use in reseeding the tree (step 1130), or if no word is to be added to the list of words (step 1120). The lexical tree pre-filtering procedure is discussed in detail in U.S. Pat. No. 5,822,730, titled "LEXICAL TREE PRE-FILTERING IN SPEECH RECOGNITION" and issued Oct. 13, 1998, which is incorporated by reference.

After the pre-filtering procedure responds with the requested list of words, the recognizer initiates a hypothesis for each word from the list and compares acoustic models for the word to the frames of parameters representing the utterance. The recognizer uses the results of these comparisons to generate scores for the hypotheses. Hypotheses having excessive scores are eliminated from further consideration. As noted above, hypotheses that comply with no active constraint grammar also are eliminated.

When the recognizer determines that a word of a hypothesis has ended, the recognizer requests from the pre-filtering procedure a list of words that may have been spoken just after the ending-time of the word. The recognizer then generates a new hypothesis for each word on the list, where each new hypothesis includes the words of the old hypothesis plus the corresponding new word from the list.

In generating the score for a hypothesis, the recognizer uses acoustic scores for words of the hypothesis, a language model score that indicates the likelihood that words of the hypothesis are used together, and scores provided for each word of the hypothesis by the pre-filtering procedure. The scores provided by the pre-filtering procedure include components corresponding to a crude acoustic comparison and a language model score indicative of the likelihood that a word is used, independently of context. The recognizer may eliminate any hypothesis that is associated with a constraint grammar (for example, a command hypothesis), but does not comply with the constraint grammar.

Figure 12:
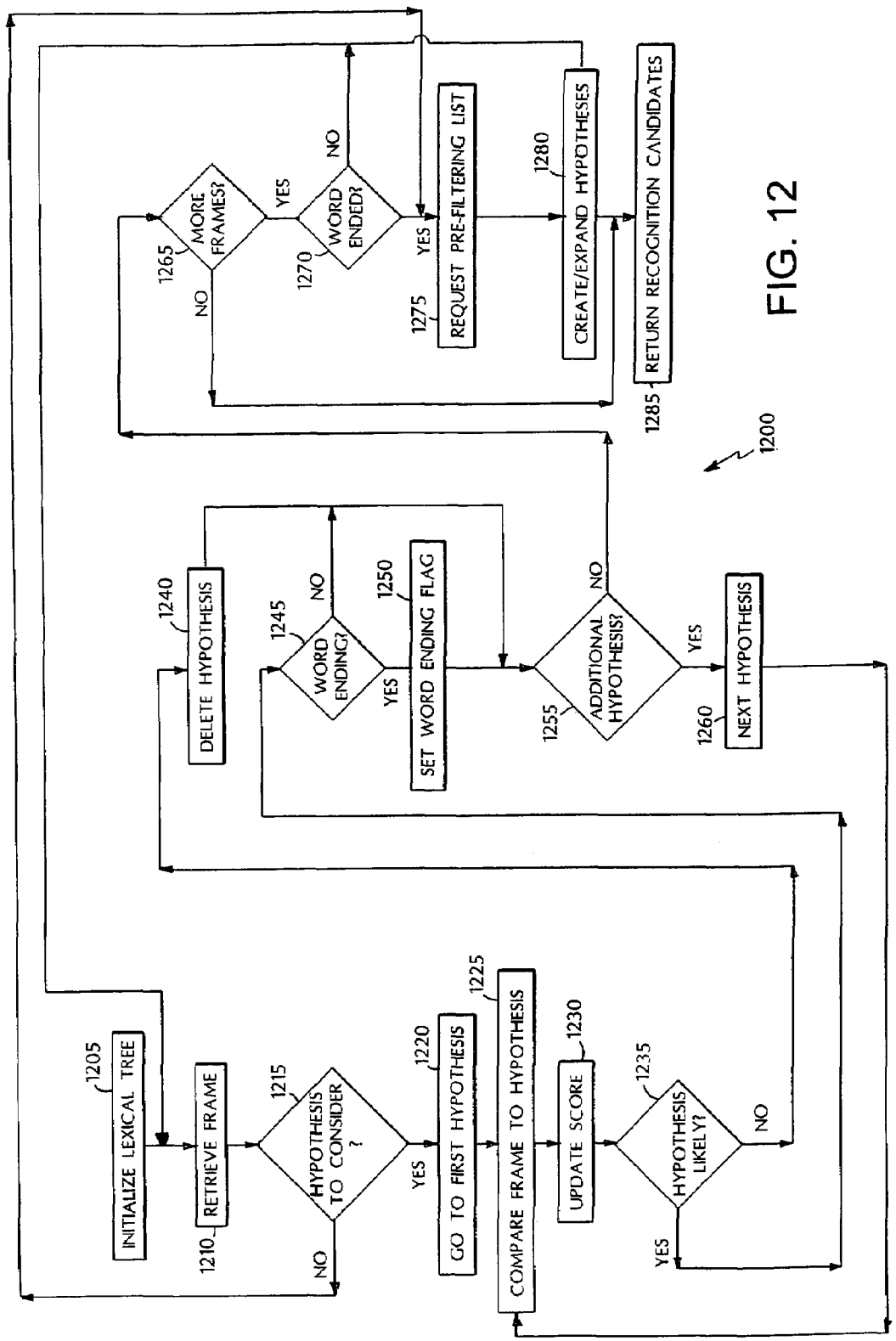
FIG. 12 is a flow chart of a speech recognition procedure.

Referring to FIG. 12, the recognizer 215 operates according to a procedure 1200. First, prior to processing, the recognizer 215 initializes the lexical tree 500 as described above (step 1205). The recognizer 215 then retrieves a frame of parameters (step 1210) and determines whether there are hypotheses to be considered for the frame (step 1215). The first frame always corresponds to silence so that there are no hypotheses to be considered for the first frame.

If hypotheses need to be considered for the frame (step 1215), the recognizer 215 goes to the first hypothesis (step 1220). The recognizer then compares the frame to acoustic models 235 for the last word of the hypothesis (step 1225) and, based on the comparison, updates a score associated with the hypothesis (step 1230).

After updating the score (step 1230), the recognizer determines whether the user was likely to have spoken the word or words corresponding to the hypothesis (step 1235). The recognizer makes this determination by comparing the current score for the hypothesis to a threshold value. If the score exceeds the threshold value, then the recognizer 215 determines that the hypothesis is too unlikely to merit further consideration and deletes the hypothesis (step 1240).

If the recognizer determines that the word or words corresponding to the hypothesis were likely to have been spoken by the user, then the recognizer determines whether the last word of the hypothesis is ending (step 1245). The recognizer determines that a word is ending when the frame corresponds to the last component of the model for the word. If the recognizer determines that a word is ending (step 1245), the recognizer sets a flag that indicates that the next frame may correspond to the beginning of a word (step 1250).

If there are additional hypotheses to be considered for the frame (step 1255), then the recognizer selects the next hypothesis (step 1260) and repeats the comparison (step 1225) and other steps. If there are no more hypotheses to be considered for the frame (step 1255), then the recognizer determines whether there are more frames to be considered for the utterance (step 1265). The recognizer determines that there are more frames to be considered when two conditions are met. First, more frames must be available. Second, the best-scoring node for the current frame or for one or more of a predetermined number of immediately preceding frames must have been a node other than the silence node (that is, the utterance has ended when the silence node is the best-scoring node for the current frame and for a predetermined number of consecutive preceding frames).

If there are more frames to be considered (step 1265) and the flag indicating that a word has ended is set (step 1270), or if there were no hypotheses to be considered for the frame (step 1215), then the recognizer requests from the pre-filtering procedure 240 a list of words that may start with the next frame (step 1275).

Upon receiving the list of words from the pre-filtering procedure, the recognizer uses the list of words to create hypotheses or to expand any hypothesis for which a word has ended (step 1280). Each word in the list of words has an associated score. Prior to adding a list word to a hypothesis, the recognizer modifies the list score ($S_L$) for the word to produce a modified list score ($S_{ML}$) as:

$$S_{ML}=S_L+L_C-L_L,$$

where $L_C$ is a language model score that represents the frequency with which the pair of words that includes the list word and the immediately preceding word in the hypothesis are used together in speech, and $L_L$ is a language model score included in the list score and corresponds to the frequency with which the list word is used in speech, without reference to context. The recognizer then adds the modified list score to the score for the hypothesis and compares the result to a threshold value. If the result is less than the threshold value, then the recognizer maintains the hypothesis. Otherwise, the recognizer determines that the hypothesis does not merit further consideration and abandons the hypothesis. As an additional part of creating or expanding the hypotheses, the recognizer compares the hypotheses to the active constraint grammars 225 and abandons any hypothesis that corresponds to no active constraint grammar. The recognizer then retrieves the next frame (step 1210) and repeats the procedure.

If there are no more speech frames to process, then the recognizer 215 provides the most likely hypotheses to the control/interface module 220 as recognition candidates (step 1285).

The control/interface module 220 controls operation of the speech recognition software and provides an interface to other software or to the user. The control/interface module receives the list of recognition candidates for each utterance from the recognizer. Recognition candidates may correspond to dictated text, speech recognition commands, or external commands. When the best-scoring recognition candidate corresponds to dictated text, the control/interface module provides the text to an active application, such as a word processor. The control/interface module also may display the best-scoring recognition candidate to the user through a graphical user interface. When the best-scoring recognition candidate is a command, the control/interface module 220 implements the command. For example, the control/interface module may control operation of the speech recognition software in response to speech recognition commands (for example, "wake up", "make that"), and may forward external commands to the appropriate software.

The control/interface module also controls the active vocabulary, acoustic models, and constraint grammars that are used by the recognizer. For example, when the speech recognition software is being used in conjunction with a particular application (for example, Microsoft Word), the control/interface module updates the active vocabulary to include command words associated with that application and activates constraint grammars associated with the application.

Other functions provided by the control/interface module 220 include an enrollment program, a vocabulary customizer, and a vocabulary manager. The enrollment program collects acoustic information from a user and trains or adapts a user's models based on that information. The vocabulary customizer optimizes the language model of a specific topic by scanning user supplied text. The vocabulary manager is a developer tool that is used to browse and manipulate vocabularies, grammars and macros. Each function of the control/interface module 220 may be implemented as an executable program that is separate from the main speech recognition software.

The enrollment program may operate in an interactive mode that guides the user through the enrollment process, or in a non-interactive mode that permits the user to enroll independently of the computer. In the interactive mode, the enrollment program displays the enrollment text to the user and the user reads the displayed text. As the user reads, the recognizer 215 uses the enrollment grammar to match a sequence of utterances by the user to sequential portions of the enrollment text. When the recognizer 215 is unsuccessful, the enrollment program prompts the user to repeat certain passages of the text. The recognizer uses acoustic information from the user's utterances to train or adapt acoustic models 235 corresponding to the matched portions of the enrollment text. The interactive enrollment program is discussed in U.S. application Ser. No. 08/825,536, titled "ENROLLMENT IN SPEECH RECOGNITION" and filed Mar. 28, 1997, now U.S. Pat. No. 6,212,498, which is incorporated by reference.

Figure 13A:
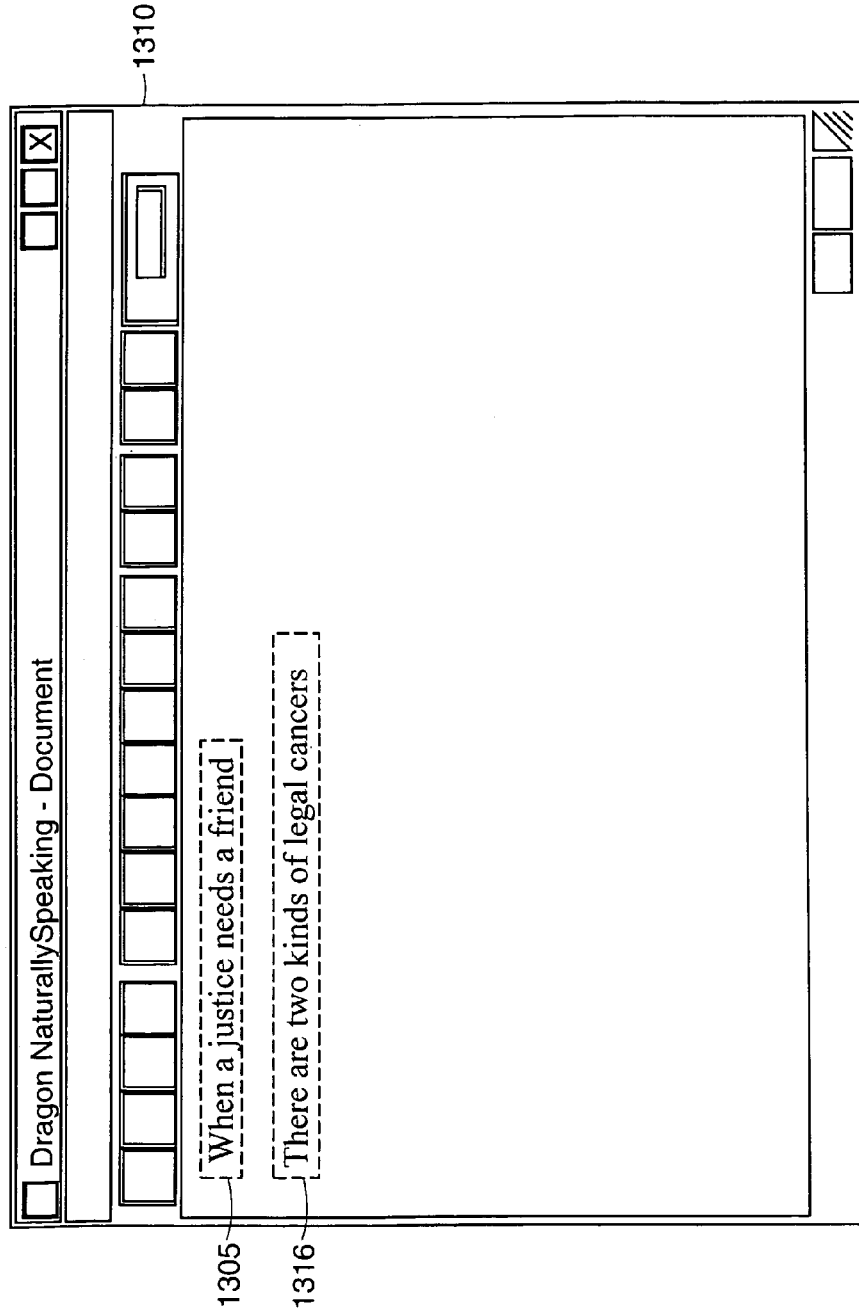
FIGS. 13A–N are screen displays of a user interface of the speech recognition system of FIG. 1.

When the system makes a recognition error, the user may invoke an appropriate correction command to remedy the error. FIGS. 13A–13N illustrate a user interface provided by the control/interface module 220 in response to a sequence of interspersed text and commands. As shown in FIG. 13A, the recognizer 215 correctly recognizes a first utterance 1300 ("When a justice needs a friend New-Paragraph") and the control/interface module 220 displays the results 1305 ("When a justice needs a friend") of recognizing the utterance in a dictation window 1310. The module 220 displays text 1305 ("When a justice needs a friend") corresponding to a text portion of the utterance and implements the formatting command ("New-Paragraph") included in the utterance.

The recognizer 215 incorrectly recognizes a second utterance 1315 ("there are two kinds of legal kibitzers") by incorrectly recognizing the word "kibitzers" as "cancers". The control/interface module 220 displays this incorrect result 1316 ("There are two kinds of legal cancers") in the dictation window 1310. The control/interface module also displays the results of recognizing the current utterance, which, in this case, is the second utterance, in a display field 1320 at the bottom of the window 1310.

Figure 13B:
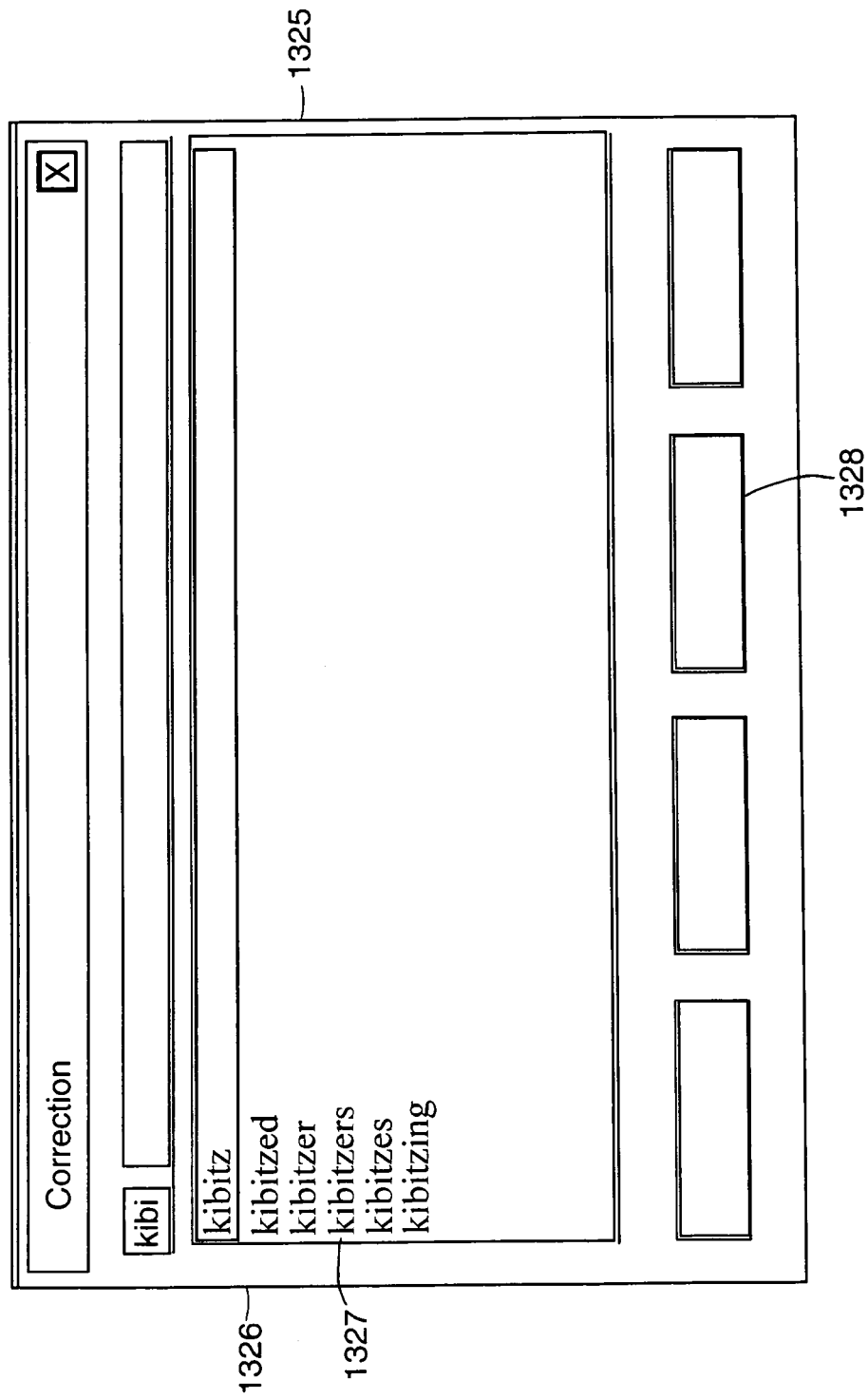

As shown in FIG. 13B, the user corrects the incorrect recognition by selecting the word "cancers" using the mouse 110 and saying "Spell That k i b i". The control/interface module responds to recognition of the "Spell That" command by displaying a correction dialog box 1325, such as is illustrated in FIG. 13B. The box 1325 displays a numbered list of words 1326 starting with the indicated letters ("kibi"). Instead of using the mouse 110 to select the word "cancer", the user could have verbally selected the word using a "Select" command by saying "Select cancer". Similarly, instead of saying "Spell That k i b i", the user could have typed the letters "k i b i".

Figure 13C:
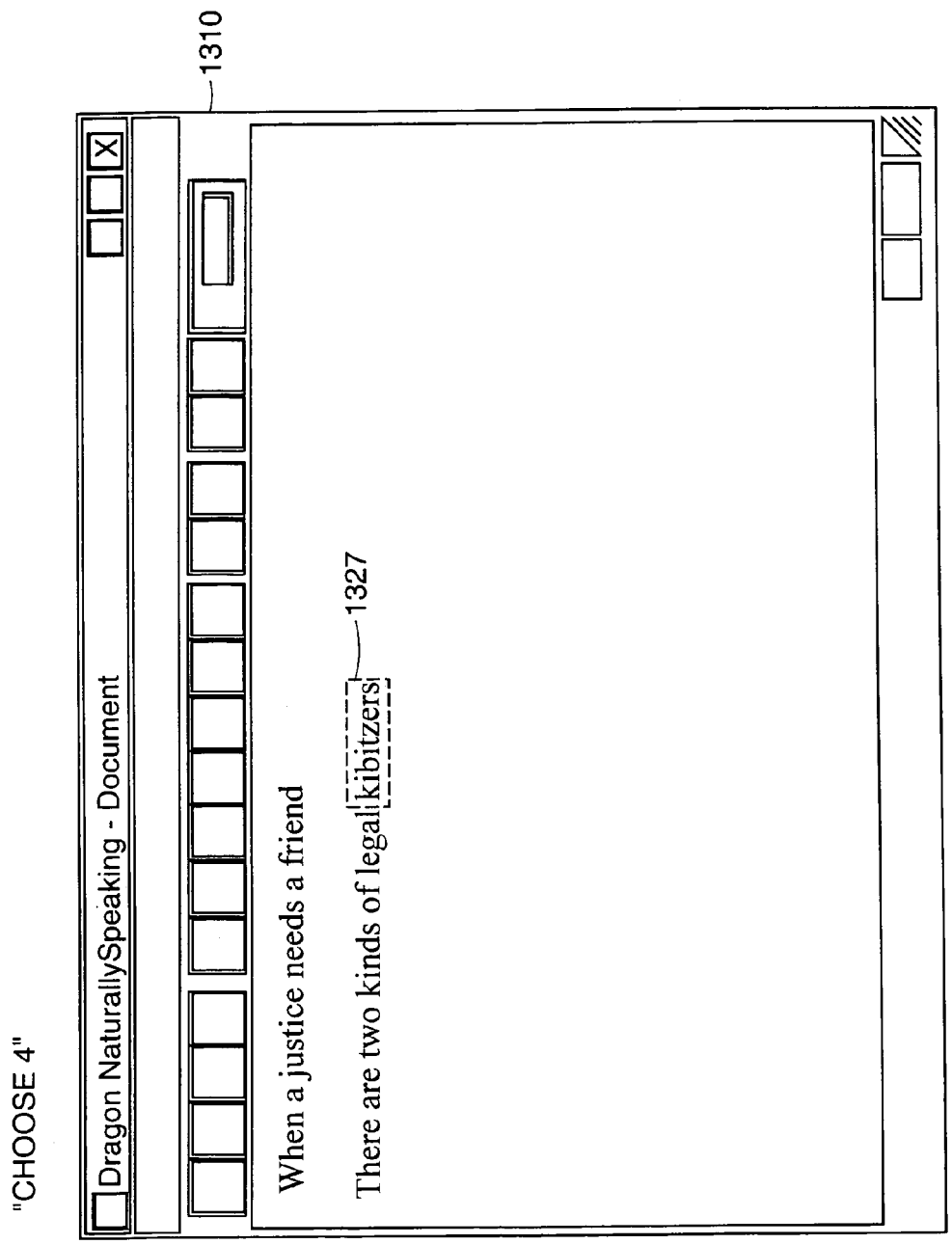

The user selects the correct word 1327 ("kibitzers") by saying "Choose 4", where "kibitzers" is the fourth word on the choice list. As shown in FIG. 13C, the control/interface module 220 responds by replacing the incorrect word ("cancers") with the selected word 1327 in the dictation window 1310.

Referring again to FIG. 13B, the correction dialog box 1325 includes a "Train" button 1328. When the user selects this button, the control/interface module responds by prompting the user through a training session to obtain one or more samples from the user of the word or words to be trained. The recognizer uses these samples to adapt acoustic models for the words to the user's speech patterns.

Figure 13D:
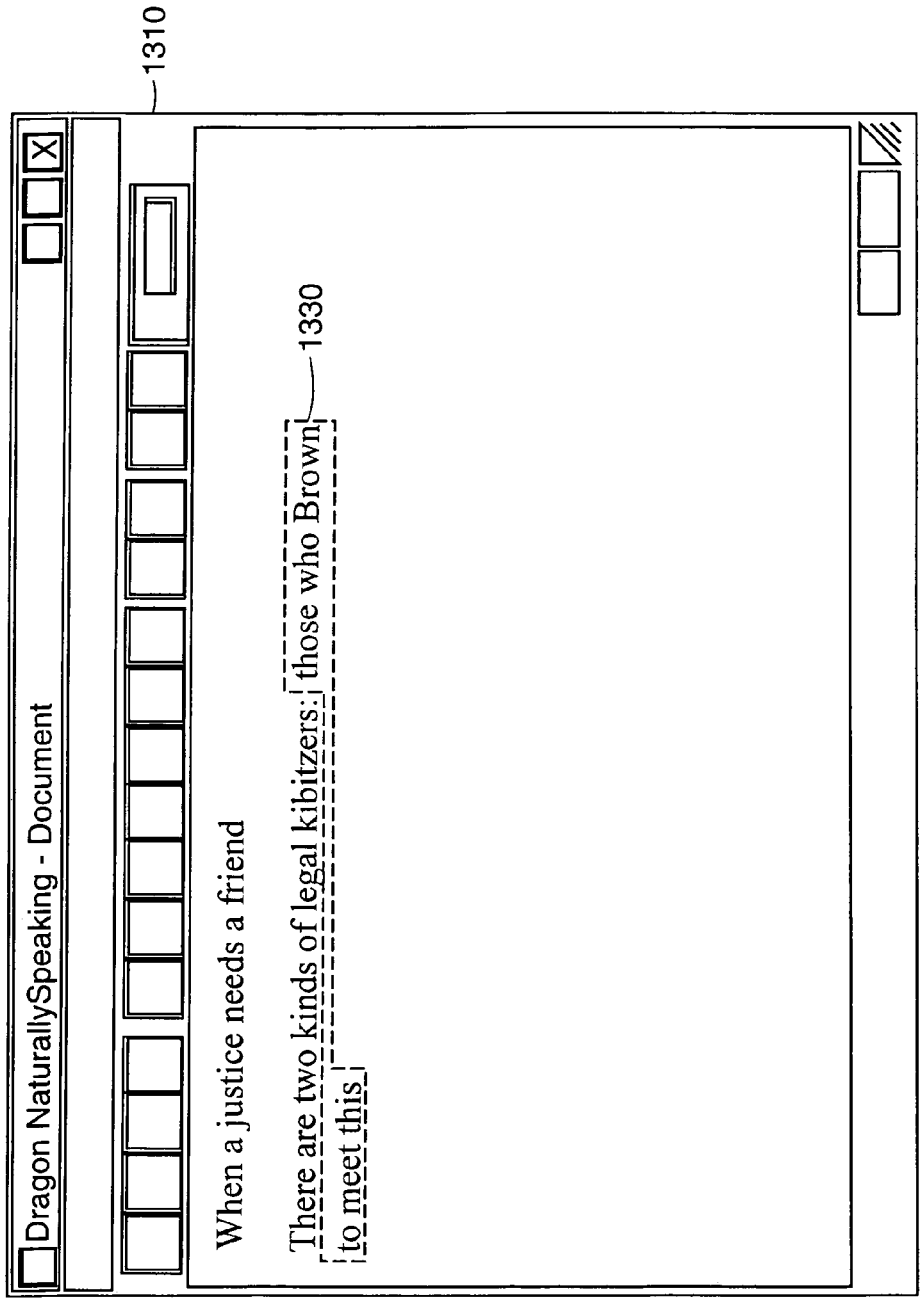
Figure 13E:
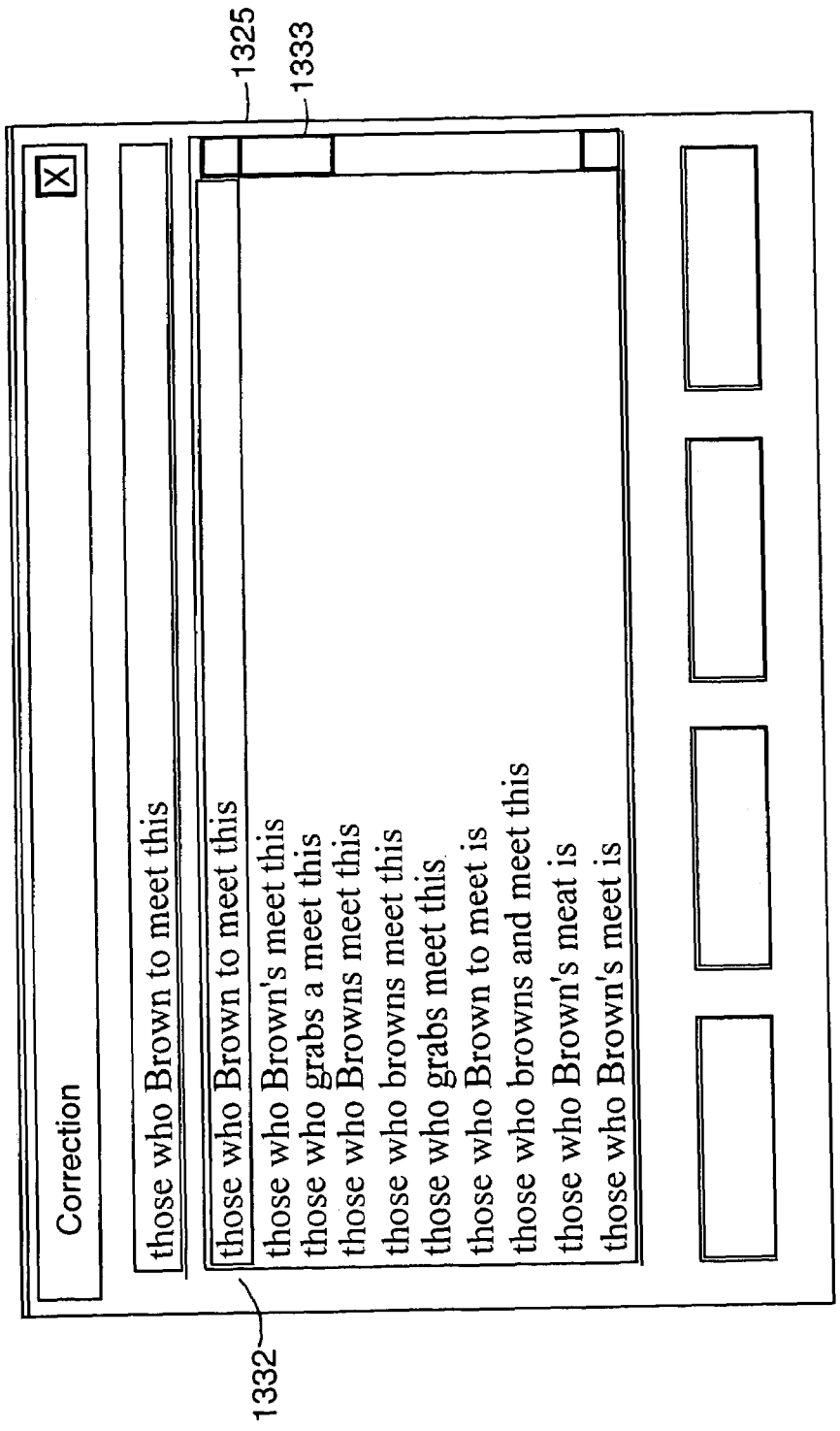

As shown in FIG. 13D, the recognizer 215 next misrecognizes a third utterance 1329 ("those who pronounce amicus") and the control/interface module 220 responds by inserting the incorrect text 1330 ("those who Brown to meet this") in the dictation window 1310. As shown in FIG. 13E, the user causes the control/interface module 220 to generate the correction dialog box 1325 by saying the "Correct That" command 1331. The correction dialog box 1325 includes a list 1332 of recognition candidates for the entire utterance 1329. Though the dialog box 1325 permits only ten recognition candidates to be displayed at a single time, the list 1332 may include more than ten entries. Additional entries may be accessed using a scroll bar 1333.

Figure 13G:
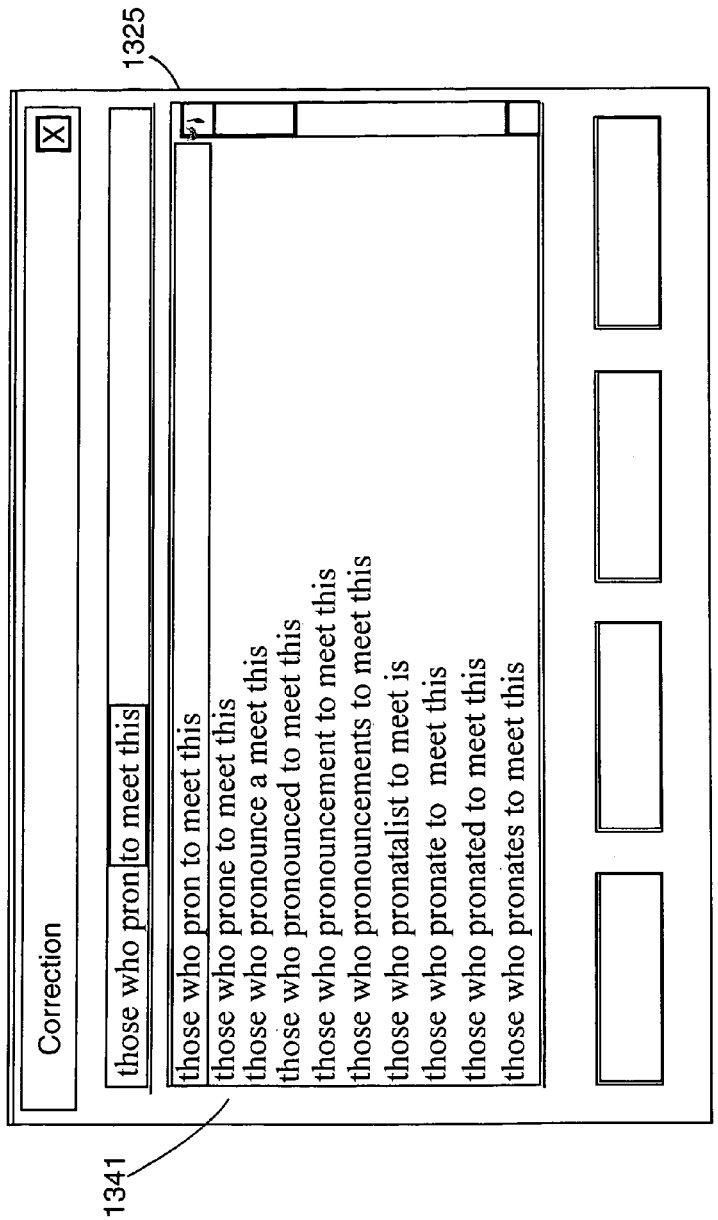

As shown in FIG. 13F, the user selects the word "Brown" 1335 using the mouse 110. As noted above, the user could also select the word "Brown" by using the voice command "Select Brown". As shown in FIG. 13G, the user then says "p r o n" 1340 to indicate that the word Brown should be replaced with a word starting with the letters "pron". The user could achieve the same result by typing the letters "pron". The control/interface module 220 responds by producing an updated list 1341 of recognition candidates, where each recognition candidate includes a word starting with "pron" in the position previously occupied by the word "Brown". Each of the recognition candidates includes the correctly-recognized words that preceded "Brown" ("those who") and the words that followed "Brown" ("to meet this").

Figure 13H:
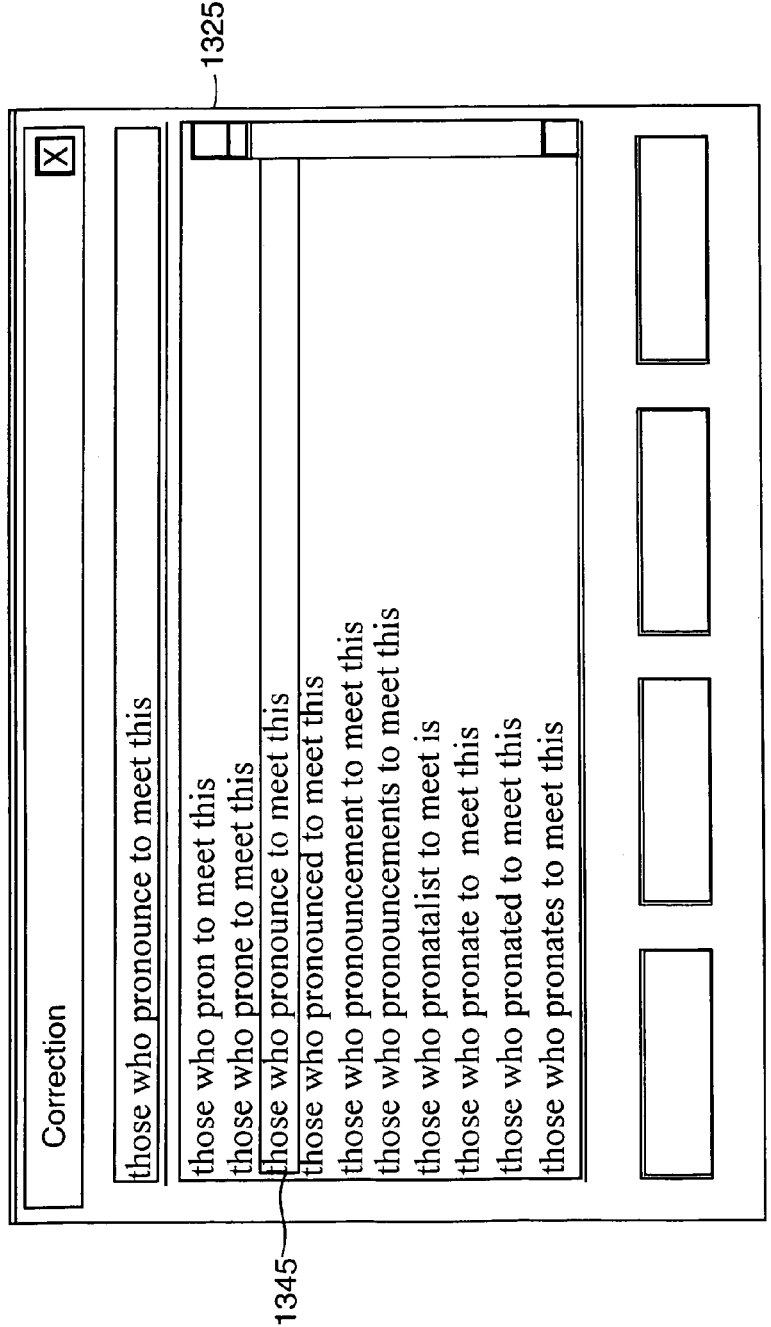

As shown in FIG. 13H, the user selects the recognition candidate 1345 that includes the word "pronounce" by using the mouse to select the third entry in the list. The user could achieve the same result by saying "Choose 3".

Figure 13J:
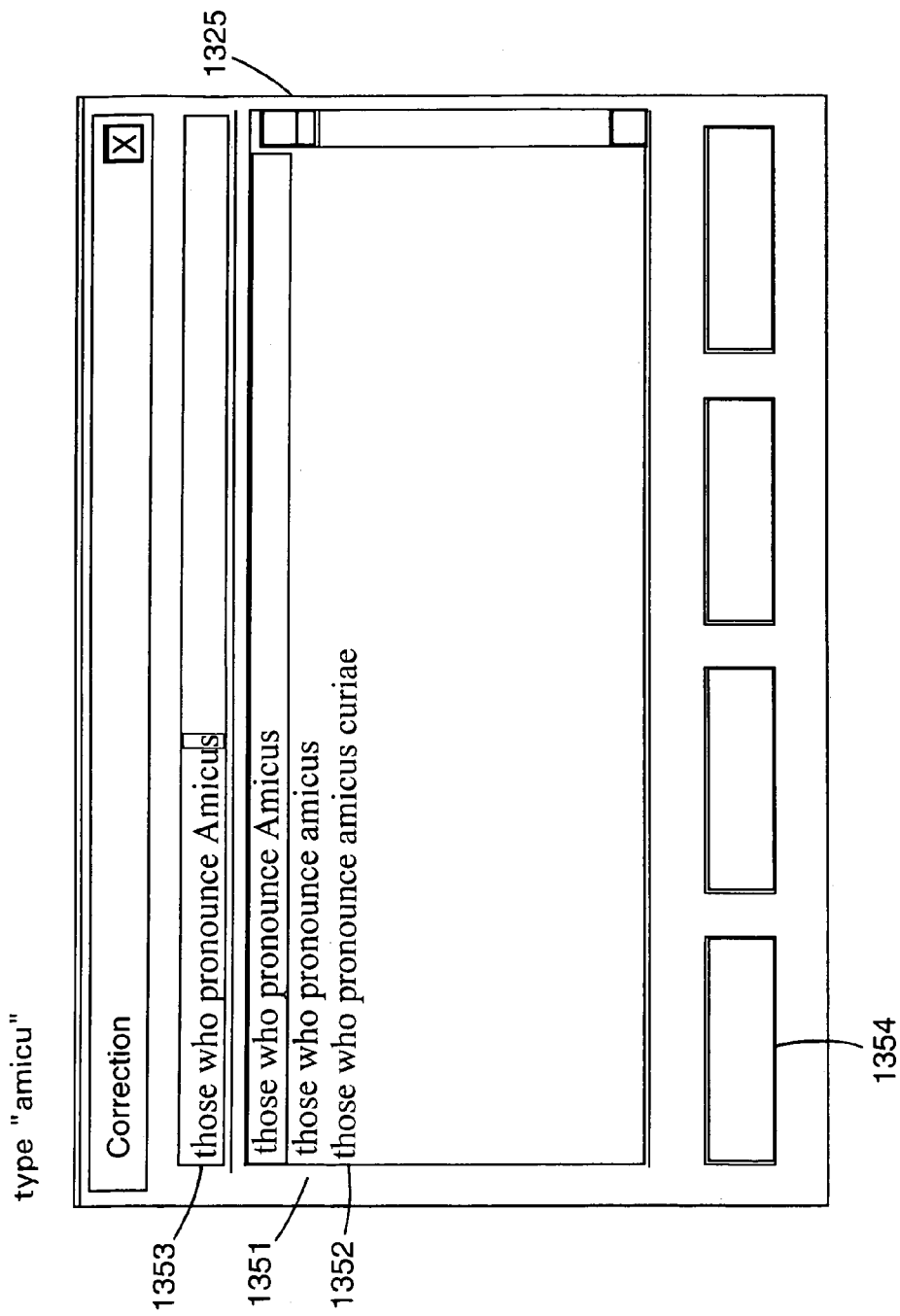

As shown in FIG. 13I, the user then uses the mouse to select the words "to meet this" 1350. Then, as shown in FIG. 13J, the user types the letters "amicu", and the control/interface module 220 responds by producing an updated list 1351 of recognition candidates that start with the words "those who pronounce" and include a word starting with the letters "amicu".

Figure 13K:
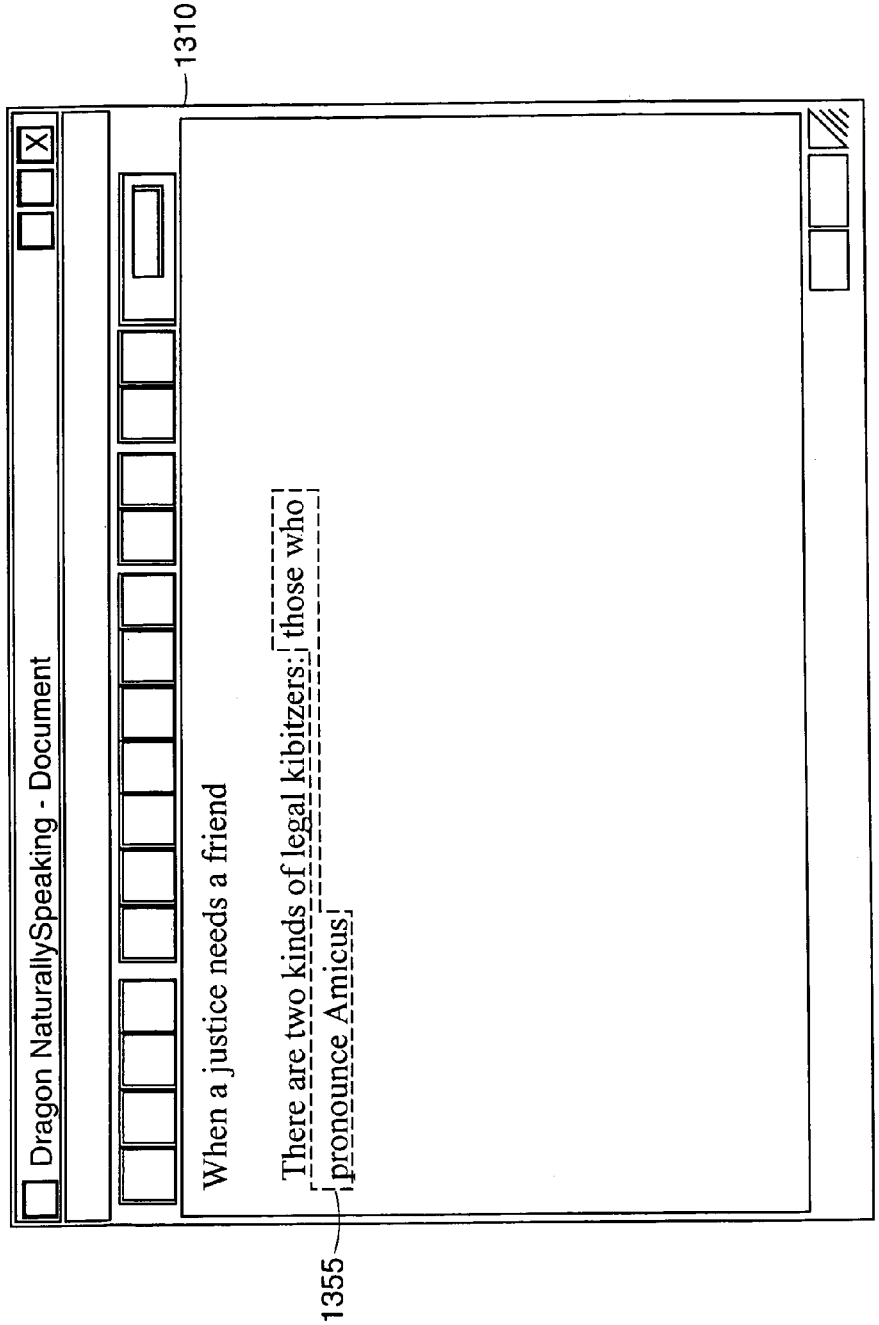

An entry 1352 of the list includes a phrase "amicus curiae" that starts with the letters "amicu". Since the first entry 1353 is the correct entry, the user clicks on an "OK" button 1354 at the bottom of the correction dialog box 1325. As shown in FIG. 13K, the control/interface module 220 responds by placing the correct version 1355 of the utterance in the dictation window 1310. As discussed above, all of the correction steps for the utterance are performed within the same correction dialog box 1325.

Figure 13L:
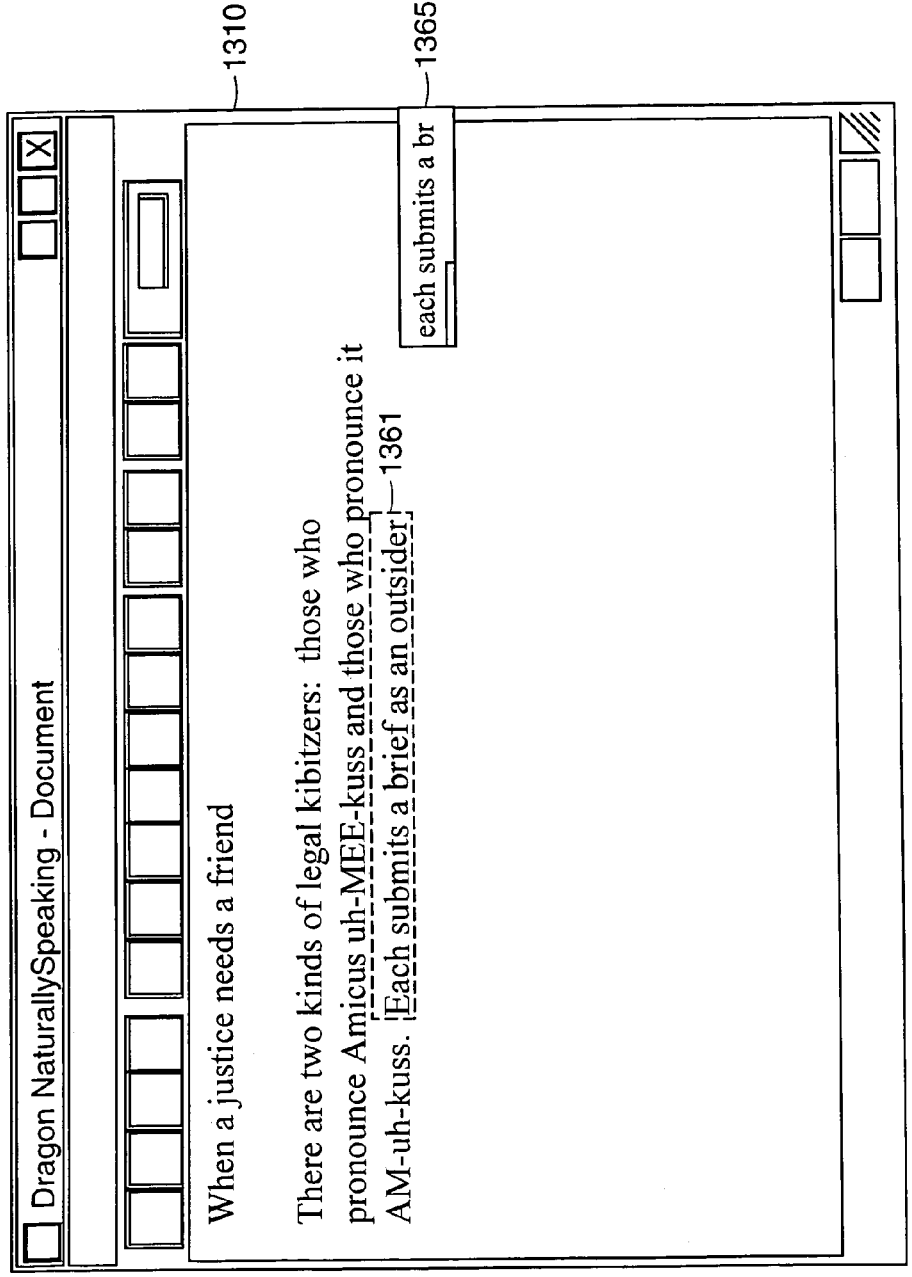
Figure 13M:
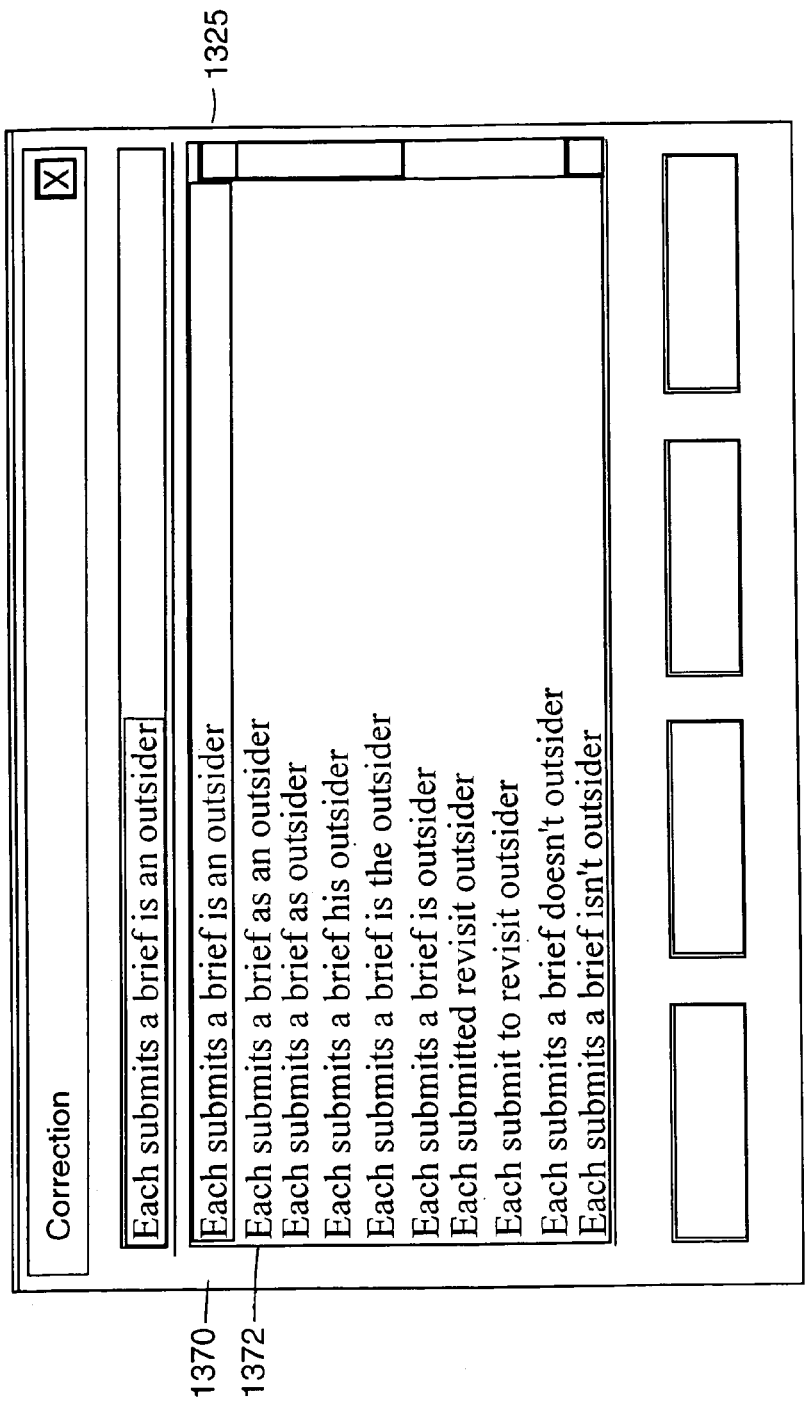
Figure 13N:
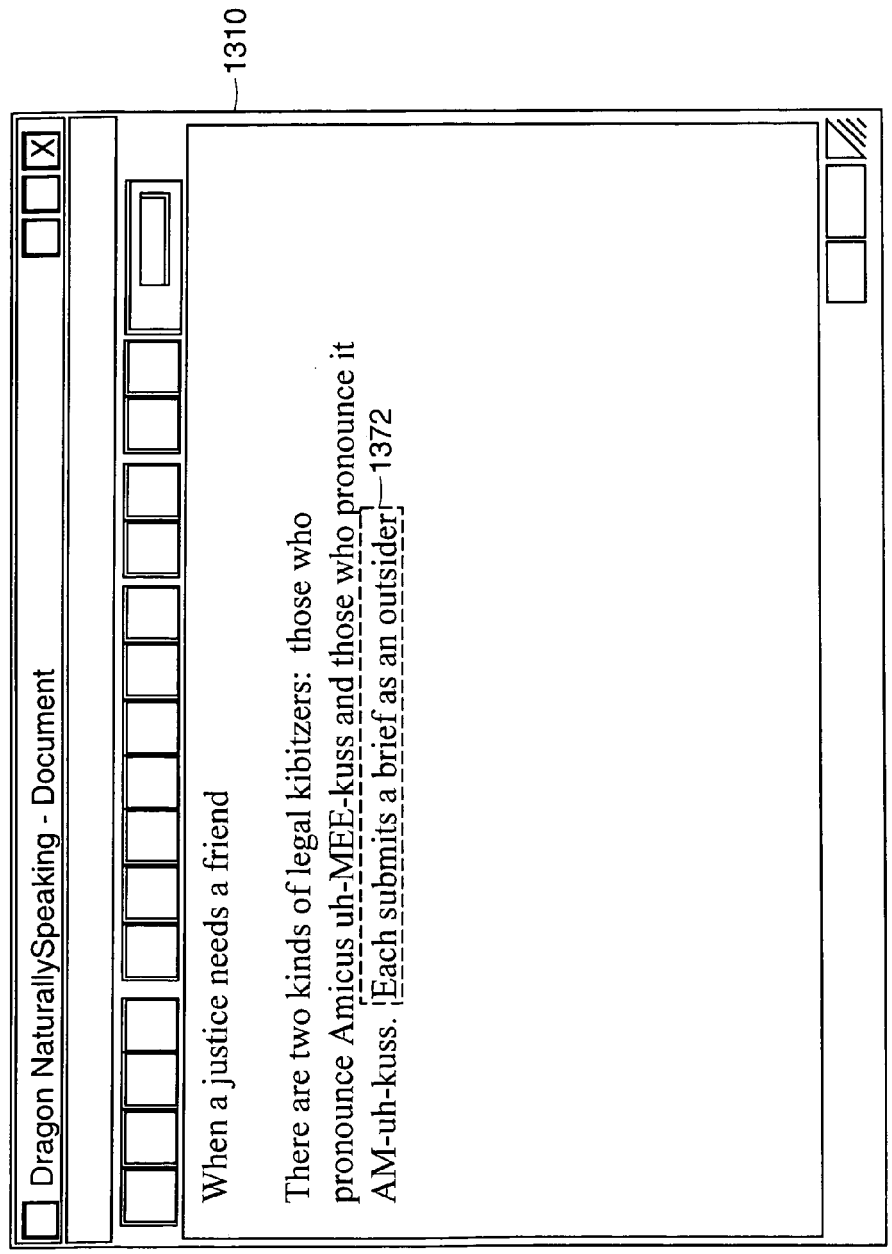

As shown in FIG. 13L, the recognizer 215 next misrecognizes an utterance 1360 ("Each submits a brief as an outsider") and the control/interface module 220 responds by inserting the incorrect text 1361 ("Each submits a brief is an outsider") in the dictation window 1310. FIG. 13L also illustrates another feature of the interface. As an utterance is being recognized, the control/interface module 220 may display a partial recognition candidate 1365 for the utterance. This partial candidate represents the best scoring hypotheses for the utterance at a point in time before the recognizer completes processing of the utterance. Display of the partial candidate is useful for long utterances that may require an extended time for processing. As shown in FIG. 13M, the user again causes the control/interface module 220 to generate the correction dialog box 1325 by saying the "Correct That" command 1331. The correction dialog box 1325 includes a list 1370 of recognition candidates for the entire utterance 1331. Since the text of the utterance 1360 appears as the second entry 1372 on the list 1370, the user selects the text by saying "Choose 2". As shown in FIG. 13N, the control/interface module 220 responds by placing the text 1372 in the dialog box 1310.

The various correction procedures are described in U.S. Pat. No. 5,794,189, issued Aug. 11, 1998 and U.S. Pat. No. 6,064,959, issued May 16, 2000, which are incorporated by reference.

Word-In-Phrase Correction

Homophones are words that sound the same but differ in spelling or representation, origin, and meaning. A word is a sound or a combination of sounds that symbolizes and communicates a meaning and origin. In English and other European languages, words are represented by one or more letters from the Roman alphabet.

In the Chinese language, words are typically represented by one or more characters from a Chinese syllabary, where each character in the syllabary is a single syllable. Generally, the one or more characters that form a word provide information relating to the meaning and phonetic representation or sound of that word. Characters in the Chinese syllabary may represent different sounds and the various sounds may be represented by different characters. Therefore, the speech recognition systems described above may fail to correctly distinguish homophones in the Chinese language.

Although the Chinese language does not have an alphabet, the sounds of the Chinese characters may be transcribed or transliterated into the Roman alphabet or another alphabet. For instance, a pinyin system developed in China and subsequently adopted by the United Nations has increasingly become a standard Romanization system worldwide for transcribing Chinese into the Roman alphabet. In the following description, we adopt the pinyin system of Romanization when transcribing Chinese characters and include this transcription in parenthesis following the Chinese characters.

Additionally, each word in Chinese has an associated tone, which is represented by a number 1, 2, 3, 4, or 5 attached to the end of the word in the pinyin system.

A word is a pure homophone of another word if the characters of the words are pronounced exactly the same. For example, both the word 宏 and the word 红 are pronounced as "hong1." Therefore, 宏 and 红 are pure homophones of each other. In the English language, the words -red- and -read- are pure homophones since they may both be pronounced as "rĕd."

A word is a near homophone of another word if the pronunciations of the words are very close to each other. For example, the word 双雕 is pronounced as "shuang1 diao1," and the word 上吊 is pronounced as "shang4 diao4." Therefore, 双雕 and 上吊 are near homophones of each other.

Figure 14:
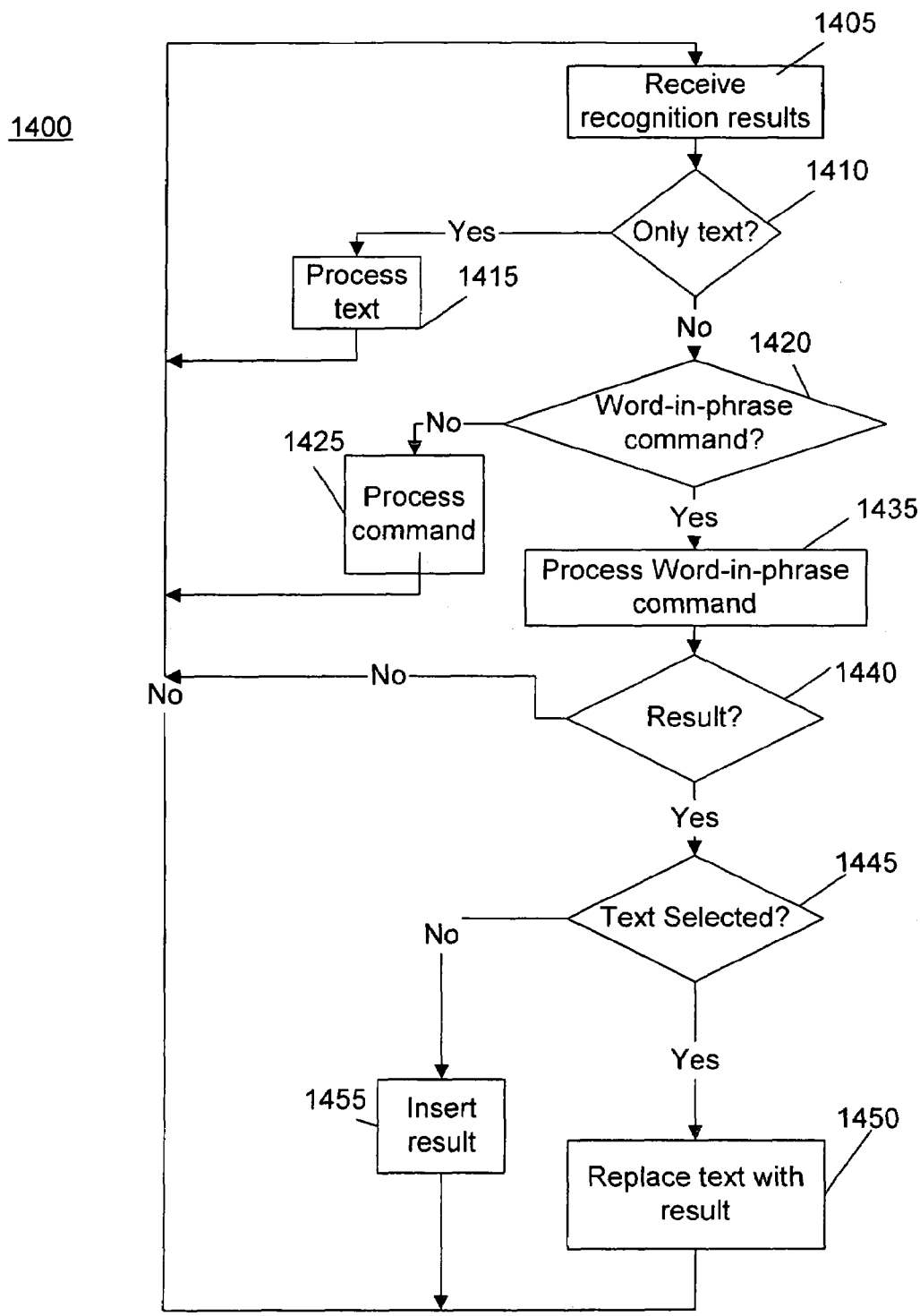
FIGS. 14 and 15 are flow charts of procedures implemented by the speech recognition system of FIG. 1.

Referring to FIG. 14, the speech recognition system may process recognition results according to a procedure 1400. Initially, the speech recognition system generates or receives recognition results for an utterance (step 1405). While the recognition results may include multiple recognition candidates, the system processes only the best-scoring recognition candidate in implementing the procedure 1400. For ease of discussion, this candidate is referred to as the top recognition candidate.

As the first step in processing the top recognition candidate, the speech recognition system determines whether the top recognition candidate includes only text (step 1410). If so, the speech recognition system processes the text (step 1415). For example, the speech recognition system may insert the text into a dictation window.

If the top recognition candidate includes something other than text (step 1410), the speech recognition system determines whether the candidate includes a word-in-phrase command that permits active disambiguation of homophones so as to avoid homophone mistakes (step 1420). The word-in-phrase command may be implemented in English as, for example, "Write <word> as in <phrase>." As an example, the system would insert "Sox" in response to "Write Sox as in Boston Red Sox," and would insert "socks" in response to "Write socks as in socks for your feet." In Chinese, the command may be implemented as, for example, "写作<phrase>的<word>," which corresponds to "xie3 zuo4 <phrase> de5 <word>" in Pinyin.

In the word-in-phrase commands, the <word> is a pronunciation of a word and the <phrase> is any meaningful phrase in which that word is correctly used. The keywords "write" and "写作" ("xie3 zuo4") instruct the speech recognition system to interpret the complete utterance "write <word> as in <phrase>" or "写作<phrase>的<word>" ("xie3 zuo4<Phrase> de5 <word>") as a command. The keywords are not required. However, without them, the grammars "<word>as in <phrase>" and "<phrase>的<word>" ("<phrase>de5<word>") may be too difficult to distinguish from text dictation, which could result in "<word>as in <phrase>" or "<phrase>的<word>" being processed as text in step 1415 instead of as word-in-phrase commands.

In generating the top recognition candidate, the speech recognition system determines whether the top recognition candidate corresponds to the word-in-phrase command "write <word>as in <phrase>" or "写作<phrase>的<word>" using a constraint grammar (step 1420). For English, the constraint grammar requires "write" to be followed by a word <word>, "as in," and a phrase <phrase>. For Chinese, the constraint grammar requires "写作"("xie3 zuo4") to be followed by a phrase <phrase>, auxiliary word 的("de5"), and <word>.

If the top recognition candidate includes a command other than the word-in-phrase command (step 1420), the speech recognition system processes the command (step 1425). For example, if the top recognition candidate includes text and a formatting command such as New-Paragraph, then the speech recognition system processes the text portion of the candidate and performs the formatting command. As another example, if the top recognition candidate includes the command "make that," then the speech recognition system performs the make that correction command.

Figure 15:
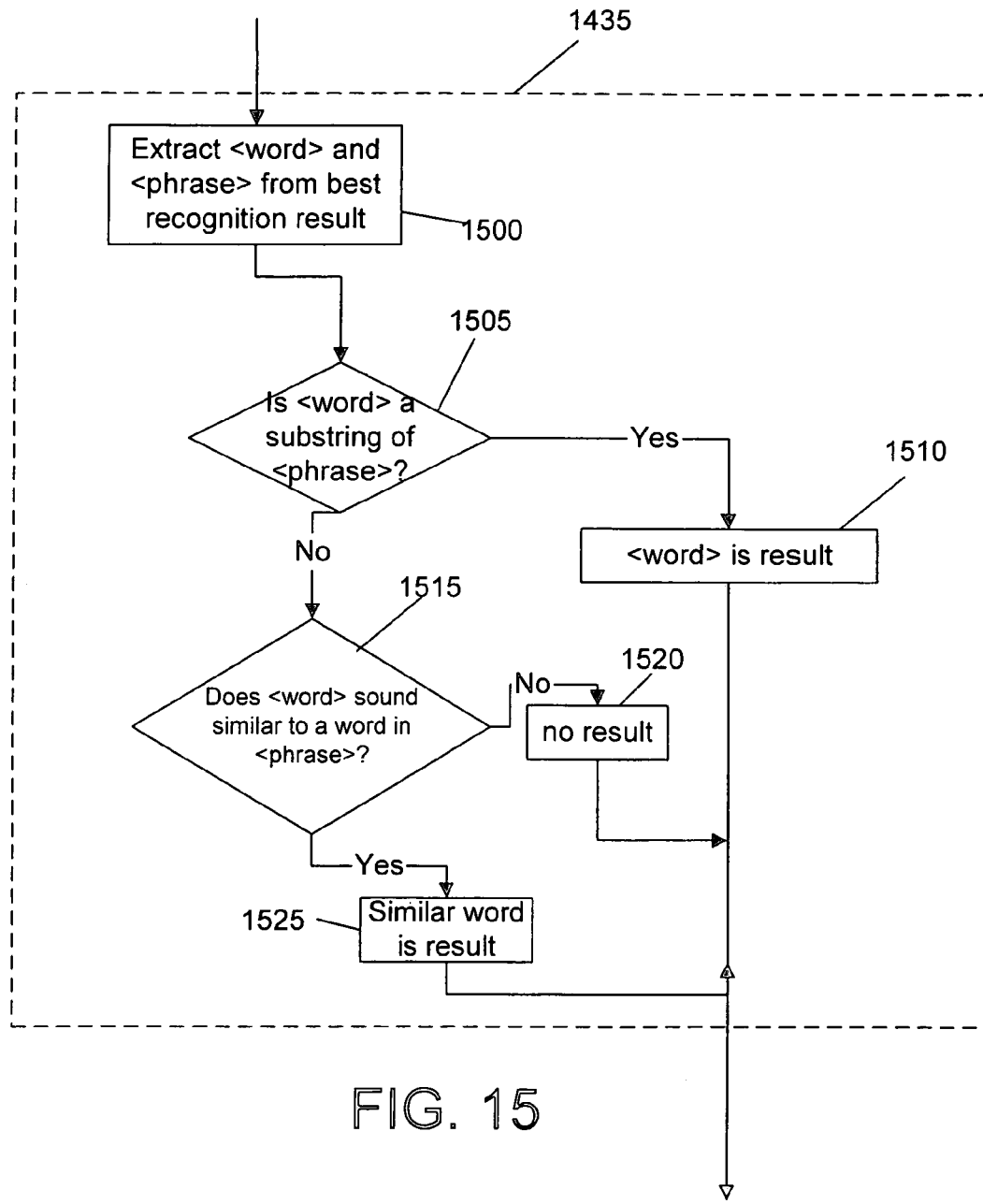

If the candidate includes a word-in-phrase command (step 1420), then the speech recognition system processes the word-in-phrase command (step 1435) and determines whether a word-in-phrase result has been produced (step 1440). Referring to FIG. 15, the speech recognition system processes the word-in-phrase command according to a procedure 1435. Initially, the speech recognition system extracts the <word> and the <phrase> from the top recognition candidate (step 1500).

After extraction, the system determines if <word> is a substring of <phrase> (step 1505). If <word> is a substring of <phrase>, then the system designates <word> as the result of the processing (step 1510).

If <word> is not a substring of <phrase> (step 1505), then the system determines if <word> sounds similar to a word in <phrase> (step 1515). The similarity between the <word> and words in the <phrase> is determined using a parameter that may be manually adjusted and fine-tuned by a developer of the speech recognition system. For example, the system may calculate a statistical difference between acoustic models for different words, and may designate words as being similar when this difference is less than a threshold amount. If no word in <phrase> sounds sufficiently similar to <word> (step 1515), then the speech recognition system produces no word-in-phrase result (step 1520). If the speech recognition system determines that <word> sounds similar to a word in <phrase> (step 1515), then the system designates that similar word from <phrase> as the result of the processing (step 1525).

Referring again to FIG. 14, if a result was not produced in processing the word-in-phrase command (step 1440), the speech recognition system takes no action and awaits further recognition results (step 1405). If a result was produced (step 1440), the speech recognition system determines if text has been selected (step 1445). Text may be selected directly by the user using any available technique. For example, the user may highlight text from the dictation window. The user also may select text using an input device such as a mouse or keyboard. In another implementation, the user may select text using a voice command, such as "select <phrase>."

If text has been selected (step 1445), the speech recognition system replaces the text with the produced result (step 1450). If text has not been selected (step 1445), the speech recognition system inserts the produced result at a predetermined location in the text, such as, for example, at the current cursor location (step 1455).

For illustrative purposes, several examples of the Chinese word-in-phrase command will now be discussed.

In a first example, if the user speaks "写作宏伟的红" ("xie3 zuo4 hong1 wei3 de5 hong1"), the speech recognition system produces 宏(hong1). In this example, <word> is "红" ("hong1") and <phrase> is "写作宏伟" ("xie3 zuo4 hong1 wei3").

As another example, if the user speaks "写作一箭双雕的上吊" ("xie3 zuo4 yi2 jian4 shuang1 diao1 de5 shang4 diao4"), the speech recognition system produces 双雕(shuang1 diao1). In this example, <word> is "上吊" ("shang4 diao4") and <phrase>is "写作一箭双雕" ("xie3 zuo4 yi2 jian4 shuang1 diao1").

If the user speaks "写作目的的的" ("xie3 zuo4 mu4 di4 de5 de1"), the speech recognition system produces 的(di4). In this example, <word> is "的" ("de1") and <phrase> is "写作目的" ("xie3 zuo4 mu4 di4").

If the user speaks "写作光明的明光" ("xie3 zuo4 guang1 ming2 de5 ming1 guang1"), the speech recognition system produces no result because neither <word> nor anything sufficiently similar found in <phrase>. In this example, <word> is "明光" ("ming1 guang1") and <phrase> is "写作光明" ("xie3 zuo4 guang1 ming2").

Other embodiments are within the scope of the following claims. For example, the techniques described here are not limited to any particular hardware or software configuration; they may find applicability in any computing or processing environment that may be used for speech recognition. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (for example, CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

The user may be required to pause before and after the word-in-phrase command, but not necessarily within the word-in-phrase command.

The speech recognition system may require <word> to be either the first or the last few characters in <phrase>. The speech recognition system also may require <word> to be a single word (that may be one or more characters long). The <word> length, which corresponds to the number of characters in the word, may be constrained to be shorter than the length of <phrase>. The <phrase> length may include any number of words or characters.

The word-in-phrase command may be implemented in any language to correct or avoid recognition errors such as those due to homophone errors. The word-in-phrase command also may be implemented to correct other types of misrecognition results.

Previously recognized text may be automatically selected by the speech recognition system at step 1445 through use of a "rewrite" command that may be implemented as: "Rewrite <word> as in <phrase>." In this case, the speech recognition system determines that text must be selected for replacement when "rewrite" is recognized before "<word> as in <phrase>." The system then responds by selecting an occurrence of <word> or a word similar to <word> from the text. The similar word does not necessarily need to be a word included in <phrase>.

The rewrite command may be used to replace a word throughout a transcript when implemented as: "Rewrite all <word> as in <phrase>." In this case, the speech recognition system determines which words in the transcript should be selected for replacement when "rewrite all" is recognized before "<word> as in <phrase>." Once again, the words to be replaced may match or sound similar to <word>.

What is claimed is:

1. A method of computer-implemented speech recognition, the method comprising:
   performing speech recognition on an utterance to produce a recognition result for the utterance, the recognition result including a command, a word, and a phrase;
   determining if the word is similar to a portion of the phrase; and producing a speech recognition result if the word is similar to a portion of the phrase.

2. The method of claim 1 wherein the recognition result comprises a command in the Chinese language.

3. The method of claim 1 wherein the recognition result comprises "Write <word> as in <phrase>" in the English language.

4. The method of claim 1 further comprising extracting the word and the phrase from the recognition result.

5. The method of claim 1 wherein determining if the word is similar to a portion of the phrase comprises determining if the word matches a substring of the phrase.

6. The method of claim 5 wherein producing the speech recognition result comprises producing the word.

7. The method of claim 1 wherein determining if the word is similar to a portion of the phrase comprises determining if the word sounds similar to a substring of the phrase.

8. The method of claim 7 wherein producing the speech recognition result comprises producing the substring of the phrase that sounds similar to the word.

9. The method of claim 1 further comprising producing no speech recognition result if the word is not similar to a portion of the phrase.

10. The method of claim 1 further comprising determining if previously-recognized text has been selected.

11. The method of claim 10 further comprising replacing selected text with the produced speech recognition result if text has been selected.

12. The method of claim 11 further comprising inserting the produced speech recognition result into the text at a predetermined location if text has not been selected.

13. A speech recognition system comprising:
an input device for receiving user input;
an output device for presenting information to the user;
a processor having communications links for transmitting information to and from the output and input devices; and
memory storing software instructions performed by the processor (i) for performing speech recognition on an utterance to produce a recognition result for the utterance, the recognition result including a command, a word, and a phrase, (ii) for determining if the word is similar to a portion of the phrase, and (iii) for producing a speech recognition result if the word is similar to a portion of the phrase.

14. The system of claim 13 wherein the recognition result comprises a command in the Chinese language.

15. The system of claim 13 wherein the recognition result comprises "Write <word> as in <phrase>" in the English language.

16. The system of claim 13 wherein the memory further comprises software instructions for extracting the word and the phrase from the recognition result.

17. The system of claim 13 wherein the software instruction for determining if the word is similar to a portion of the phrase comprises a software instruction for determining if the word matches a substring of the phrase.

18. The system of claim 17 wherein the software instruction for producing the speech recognition result comprises a software instruction for producing the word.

19. The system of claim 13 wherein the software instruction for determining if the word is similar to a portion of the phrase comprises a software instruction for determining if the word sounds similar to a substring of the phrase.

20. The system of claim 19 wherein the software instruction for producing the speech recognition result comprises a software instruction for producing the substring of the phrase that sounds similar to the word.

21. The system of claim 13 wherein the memory further comprises a software instruction for producing no speech recognition result if the word is not similar to a portion of the phrase.

22. The system of claim 13 wherein the memory further comprises a software instruction for determining if previously-recognized text has been selected.

23. The system of claim 22 wherein the memory further comprises a software instruction for replacing selected text with the produced speech recognition result if text has been selected.

24. The system of claim 23 wherein the memory further comprises a software instruction for inserting the produced speech recognition result into the text at a predetermined location if text has not been selected.

25. A computer-readable medium, comprising software instructions for speech recognition, the software instructions comprising:
a first code segment to perform speech recognition on an utterance to produce a recognition result for the utterance, the recognition result including a command, a word, and a phrase;
a second code segment to determine if the word is similar to a portion of the phrase; and
a third code segment to produce a speech recognition result if the word is similar to a portion of the phrase.

26. The computer readable medium of claim 25 wherein the recognition result comprises a command in the Chinese language.

27. The computer readable medium of claim 25 wherein the recognition result comprises "Write <word> as in <phrase>" in the English language.

28. The computer readable medium of claim 25 wherein the software instructions comprise a fourth code segment to extract the word and the phrase from the recognition result.

29. The computer readable medium of claim 25 wherein the second code segment comprises a code segment to determine if the word matches a substring of the phrase.

30. The computer readable medium of claim 29 wherein the third code segment comprises a code segment to produce the word.

31. The computer readable medium of claim 25 wherein the second code segment comprises a code segment to determine if the word sounds similar to a substring of the phrase.

32. The computer readable medium of claim 31 wherein the third code segment comprises a code segment to produce the substring of the phrase that sounds similar to the word.

33. The computer readable medium of claim 25 wherein the software instructions comprise a fourth code segment to produce no speech recognition result if the word is not similar to a portion of the phrase.

34. The computer readable medium of claim 25 wherein the software instructions comprise a fourth code segment to determine if previously-recognized text has been selected.

35. The computer readable medium of claim 34 wherein the software instructions comprise a fifth code segment to replace selected text with the produced speech recognition result if text has been selected.

36. The computer readable medium of claim 35 wherein the software instructions comprise a sixth code segment to insert the produced speech recognition result into the text at a predetermined location if text has not been selected.

* * * * *